United States Patent
Willars et al.

(10) Patent No.: US 11,711,863 B2
(45) Date of Patent: *Jul. 25, 2023

(54) SLICING OF NETWORK RESOURCES FOR DUAL CONNECTIVITY USING NR

(71) Applicant: Telefonaktiebolaget LM Ericsson (publ), Stockholm (SE)

(72) Inventors: Per Willars, Vaxholm (SE); Angelo Centonza, Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 270 days.

This patent is subject to a terminal disclaimer.

(21) Appl. No.: 17/196,199

(22) Filed: Mar. 9, 2021

(65) Prior Publication Data
US 2021/0195673 A1  Jun. 24, 2021

Related U.S. Application Data

(63) Continuation of application No. 16/332,281, filed as application No. PCT/SE2019/050072 on Jan. 30, 2019, now Pat. No. 10,980,075.
(Continued)

(51) Int. Cl.
*H04W 76/16* (2018.01)
*H04W 76/11* (2018.01)
(Continued)

(52) U.S. Cl.
CPC ......... *H04W 76/16* (2018.02); *H04L 5/0092* (2013.01); *H04W 72/27* (2023.01); *H04W 76/11* (2018.02); *H04W 88/06* (2013.01); *H04W 84/042* (2013.01)

(58) Field of Classification Search
CPC ..... H04W 36/00; H04W 36/08; H04W 36/24; H04W 36/28; H04W 36/30; H04W 72/27;
(Continued)

(56) References Cited

U.S. PATENT DOCUMENTS 10,980,075 B2 * 4/2021 Willars ............... H04W 76/15
2005/0041623 A1   2/2005 Livet et al.
(Continued)

FOREIGN PATENT DOCUMENTS

CN   103517325 A * 1/2014 ........... H04W 28/02

OTHER PUBLICATIONS

"3GPP TS 38.300 V0.6.0", 3rd Generation Partnership Project; Technical Specification Group Radio Access Network; NR; NR and NG-RAN Overall Description; Stage 2 (Release 15), Aug. 2017, pp. 1-59.
(Continued)

*Primary Examiner* — Kevin C. Harper
(74) *Attorney, Agent, or Firm* — Murphy, Bilak & Homiller, PLLC

(57) ABSTRACT

Embodiments include methods performed by an evolved Node B (eNB) configured with a Long-Term Evolution (LTE) radio access technology (RAT). Such methods include managing access to resources of the LTE RAT by a user equipment (UE) served by the eNB, based on one or more radio resource management (RRM) policies for the LTE RAT. Such methods also include sending, to a next-generation Node B (gNB) configured with a New Radio (NR) RAT, a request to establish dual connectivity with the UE as a secondary node (SN), wherein the request includes a Subscribers Profile ID for RAT/Frequency Priority (SPID) that is associated with the one or more RRM policies. Other embodiments include complementary methods performed by a gNB, as well as eNBs and gNBs configured to perform such methods.

20 Claims, 17 Drawing Sheets

Related U.S. Application Data

(60) Provisional application No. 62/649,968, filed on Mar. 29, 2018.

(51) Int. Cl.
*H04L 5/00* (2006.01)
*H04W 88/06* (2009.01)
*H04W 72/27* (2023.01)
*H04W 84/04* (2009.01)

(58) Field of Classification Search
CPC ..... H04W 76/10–11; H04W 76/15–16; H04W 88/06; H04L 5/0092
See application file for complete search history.

(56) References Cited

U.S. PATENT DOCUMENTS

| | | |
|---|---|---|
| 2010/0202543 A1 | 8/2010 | Raif et al. |
| 2014/0179316 A1 | 6/2014 | Hu |
| 2014/0241317 A1 | 8/2014 | Jamadagni et al. |
| 2015/0181473 A1* | 6/2015 | Horn ................ H04W 36/0033 370/329 |
| 2018/0013680 A1 | 1/2018 | Bull et al. |
| 2018/0049213 A1 | 2/2018 | Gholmieh et al. |
| 2018/0124648 A1* | 5/2018 | Park .................... B25B 23/103 |
| 2018/0262980 A1 | 9/2018 | Jeong et al. |
| 2018/0324624 A1* | 11/2018 | Gu .................... H04W 36/0088 |
| 2018/0324663 A1 | 11/2018 | Park et al. |
| 2019/0182716 A1* | 6/2019 | Futaki .................. H04W 80/02 |
| 2019/0335532 A1 | 10/2019 | Kim et al. |
| 2020/0037197 A1* | 1/2020 | Cho .................. H04W 28/0263 |
| 2020/0267753 A1* | 8/2020 | Adjakple .......... H04W 72/1268 |

OTHER PUBLICATIONS

"3GPP TS 38.423 V15.1.0", 3rd Generation Partnership Project; Technical Specification Group Radio Access Network; NG-RAN; Xn application protocol (XnAP) (Release 15), Sep. 2018, pp. 1-263.

"Dual Connectivity for Slicing", 3GPP TSG-RAN WG3 95bis; R3-171252; Spokane, Washington, Apr. 3-7, 2017, pp. 1-2.

"Slice Availability", 3GPP TSG-RAN WG2 #101; R2-1802636 (Revision of R2-1800378); Athens, Greece, Feb. 26-Mar. 2, 2018, pp. 1-2.

"Slice Impact on Dual Connectivity", 3GPP TSG-RAN WG3 NR AdHoc; R3-172453; Qingdao, China, Jun. 27-29, 2017, pp. 1-2.

"3GPP TS 38.401 V15.1.0", 3rd Generation Partnership Project; Technical Specification Group Radio Access Network; NG-RAN; Architecture description (Release 15), Mar. 2018, pp. 1-23.

"3GPP TR 38.801 V1.2.0", 3rd Generation Partnership Project; Technical Specification Group Radio Access Network; Study on New Radio Access Technology; Radio Access Architecture and Interfaces (Release 14), Feb. 2017, pp. 1-90.

"3GPP TS 33.401 V12.14.0", 3rd Generation Partnership Project; Technical Specification Group Services and System Aspects; 3GPP System Architecture Evolution (SAE); Security architecture (Release 12), Mar. 2015, pp. 1-131.

"3GPP TS 23.501 V2.0.0", 3rd Generation Partnership Project; Technical Specification Group Services and System Aspects; System Architecture for the 5G System; Stage 2 (Release 15), Dec. 2017, pp. 1-183.

"3GPP TS 36.423 V15.0.0", 3rd Generation Partnership Project; Technical Specification Group Radio Access Network; Evolved Universal Terrestrial Radio Access Network; (E-UTRAN); X2 application protocol (X2AP); (Release 15), Dec. 2017, pp. 1-38.

"3GPP TS 37.340 V15.0.0", 3rd Generation Partnership Project; Technical Specification Group Radio Access Network; Evolved Universal Terrestrial Radio Access (E-UTRA) and NR; Multi-connectivity; Stage 2 (Release 15), Dec. 2017, pp. 1-51.

* cited by examiner

| IE/Group Name | Presence | IE type and reference | Semantics description | Criticality | Assigned Criticality |
|---|---|---|---|---|---|
| Message Type | M | 9.2.13 | | YES | reject |
| MeNB UE X2AP ID | M | eNB UE X2AP ID 9.2.24 | Allocated at the MeNB | YES | reject |
| NR UE Security Capabilities | M | 9.2.107 | | YES | reject |
| SgNB Security Key | M | 9.2.101 | The S-KgNB which is provided by the MeNB, see TS 33.401 [18]. | YES | reject |
| SgNB UE Aggregate Maximum Bit Rate | M | UE Aggregate Maximum Bit Rate 9.2.12 | The UE Aggregate Maximum Bit Rate is split into MeNB UE Aggregate Maximum Bit Rate and SgNB UE Aggregate Maximum Bit Rate which are enforced by MeNB and en-gNB respectively. | YES | reject |
| Serving PLMN | O | PLMN Identity 9.2.4 | The serving PLMN of the SCG in the en-gNB. | YES | ignore |
| Handover Restriction List | O | 9.2.3 | | YES | ignore |
| E-RABs To Be Added List | | | | YES | reject |
| >E-RABs To Be Added Item | | | | EACH | reject |
| >>E-RAB ID | M | 9.2.23 | | – | |
| >>EN-DC Resource Configuration | M | EN-DC Resource Configuration 9.2.108 | Indicates the PDCP and Lower Layer MCG/SCG configuration. | – | |
| >>CHOICE Resource Configuration | M | | | | |
| >>>PDCP present in SN | | | This choice tag is used if the PDCP at SgNB IE in the EN-DC Resource Configuration IE is set to the value "present". | | |
| >>>>Full E-RAB Level QoS Parameters | M | E-RAB Level QoS Parameters 9.2.9 | Includes E-RAB level QoS parameters as received on S1-MME. | – | |
| >>>>Maximum MCG admittable E-RAB Level QoS Parameters | C-ifMCGandSCGpresent | E-RAB Level QoS Parameters 9.2.9 | Includes the E-RAB Level QoS parameters admittable by the MCG | – | |
| >>>>DL Forwarding | O | 9.2.5 | | – | |
| >>>>MeNB DL GTP TEID at MCG | C-ifMCGpresent | GTP Tunnel Endpoint 9.2.1 | MeNB endpoint of the X2-U transport bearer at MCG. For delivery of DL PDCP PDUs. | – | |

*FIG. 11A*

| IE/Group Name | Presence | IE type and reference | Semantics description | Criticality | Assigned Criticality |
|---|---|---|---|---|---|
| >>>>S1 UL GTP Tunnel Endpoint | M | GTP Tunnel Endpoint 9.2.1 | SGW endpoint of the S1-U transport bearer. For delivery of UL PDUs from the en-gNB. | – | |
| >>>PDCP not present in SN | | | This choice tag is used if the PDCP at SgNB IE in the EN-DC Resource Configuration IE is set to the value "not present". | | |
| >>>>Requested SCG E-RAB Level QoS Parameters | M | E-RAB Level QoS Parameters 9.2.9 | Includes E-RAB level QoS parameters requested to be provided by the SCG | – | |
| >>>>MeNB UL GTP TEID at PDCP | M | GTP Tunnel Endpoint 9.2.1 | MeNB endpoint of the X2-U transport bearer. For delivery of UL PDCP PDUs. | – | |
| >>>>RLC Mode | M | RLC Mode 9.2.119 | Indicates the RLC mode. | – | |
| >>>>UL configuration | C-ifMCGandSCGpresent | 9.2.118 | Information about UL usage in the en-gNB. | – | |
| MeNB to SgNB Container | M | OCTET STRING | Includes the SCG-ConfigInfo message as defined in TS 36.331 [31]. | YES | reject |
| SgNB UE X2AP ID | O | en-gNB UE X2AP ID 9.2.100 | Allocated at the en-gNB. | YES | reject |
| Expected UE Behaviour | O | 9.2.70 | | YES | ignore |
| MeNB UE X2AP ID Extension | O | Extended eNB UE X2AP ID 9.2.86 | Allocated at the MeNB. | YES | reject |
| Requested MCG split SRBs | O | ENUMERATED (srb1, srb2, srb1&2, …) | Indicates that resources for MCG Split SRB are requested. | YES | reject |
| MeNB Resource Coordination Information | O | 9.2.116 | Information used to coordinate resources utilisation between MeNB and en-gNB. | YES | ignore |
| >Subscriber Profile ID for RAT/Frequency priority | O | 9.2.25 | | – | – |

*FIG. 11B*

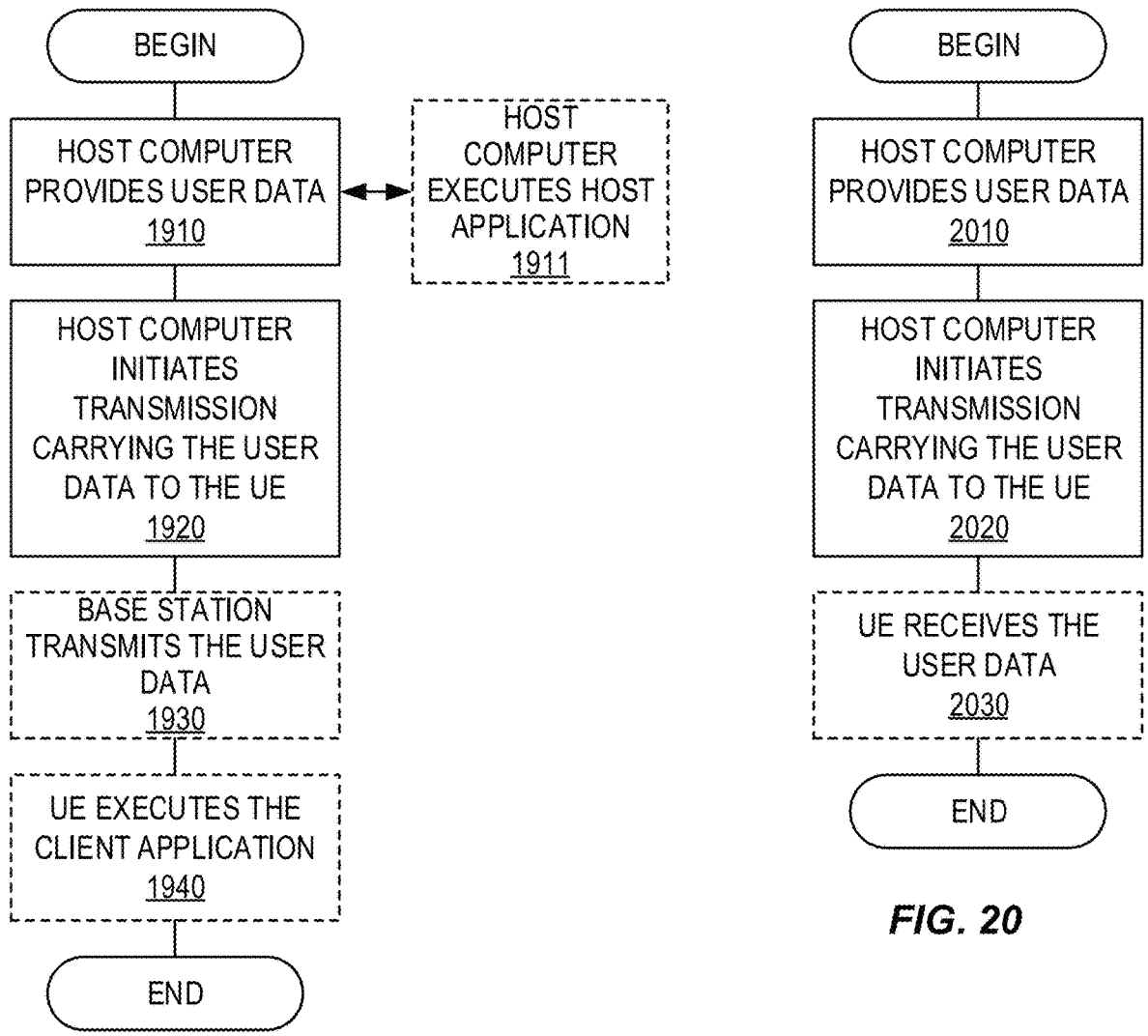

SLICING OF NETWORK RESOURCES FOR DUAL CONNECTIVITY USING NR

CROSS-REFERENCE TO RELATED APPLICATIONS

This application is a continuation of, and claims the benefit of priority from, U.S. application Ser. No. 16/332,281 filed on Mar. 11, 2019, which is a national-stage application claiming priority to International Appl. No. PCT/SE2019/050072 filed on Jan. 30, 2019, which claims the benefit of U.S. Prov. Appl. No. 62/649,968 filed on Mar. 29, 2018. The entire disclosures of the above-mentioned applications are incorporated herein by reference for all purposes.

TECHNICAL FIELD

The present application relates generally to the field of wireless communication networks, and more specifically to dual-connectivity between a user equipment and a wireless communication network using two different types of radio access technologies (RATs).

BACKGROUND

Multi-connectivity (also referred to as "Dual-Connectivity" or "DC") can be envisioned as an important feature for fifth-generation (5G) RAN architectures standardized by 3GPP. FIG. 1 illustrates a high-level view of the 5G network architecture, consisting of a Next Generation RAN (NG-RAN) and a 5G Core (5GC). The NG-RAN can comprise a set of next-generation Node B's (gNBs) connected to the 5GC via one or more NG interfaces, whereas the gNBs can be connected to each other via one or more Xn interfaces. Each of the gNBs can support frequency division duplexing (FDD), time division duplexing (TDD), or a combination thereof.

The NG RAN logical nodes shown in FIG. 1 (and described in TR38.801 v1.2.0) include a Central Unit (CU or gNB-CU) and one or more Distributed Units (DU or gNB-DU). CU is a logical node that is a centralized unit that hosts high layer protocols and includes a number of gNB functions, including controlling the operation of DUs. A DU is a decentralized logical node that hosts lower layer protocols and can include, depending on the functional split option, various subsets of the gNB functions. (As used herein, the terms "central unit" and "centralized unit" are used interchangeably, and the terms "distributed unit" and "decentralized unit" are used interchangeability.)

The NG, Xn-C and F1 items shown in FIG. 1 are logical interfaces. For NG-RAN, the NG and Xn-C interfaces for a split gNB (e.g., consisting of a gNB-CU and gNB-DUs) terminate in the gNB-CU. Likewise, for EN-DC, the S1-U and X2-C interfaces for a split gNB terminate in the gNB-CU. The gNB-CU connects to gNB-DUs over respective F1 logical interfaces. The gNB-CU and connected gNB-DUs are only visible to other gNBs and the 5GC as a gNB, e.g., the F1 interface is not visible beyond gNB-CU.

Furthermore, the F1 interface between the gNB-CU and gNB-DU is specified, or based on, the following general principles:

F1 is an open interface;
F1 supports the exchange of signalling information between respective endpoints, as well as data transmission to the respective endpoints;
from a logical standpoint, F1 is a point-to-point interface between the endpoints (even in the absence of a physical direct connection between the endpoints);
F1 supports control plane (CP) and user plane (UP) separation, such that a gNB-CU may be separated in CP and UP;
F1 separates Radio Network Layer (RNL) and Transport Network Layer (TNL);
F1 enables exchange of user-equipment (UE) associated information and non-UE associated information;
F1 is defined to be future proof with respect to new requirements, services, and functions;
A gNB terminates X2, Xn, NG and S1-U interfaces.

Furthermore, a CU can host protocols and/or layers such as Radio Resource Control (RRC), Service Data Adaptation Protocol (SDAP), and Packet Data Convergence Protocol (PDCP), while a DU can host protocols and/or layers such as Radio Link Control (RLC), Medium Access Control (MAC), and physical layer (PHY). Other variants of protocol distributions between CU and DU exist, such as hosting the RRC, PDCP and part of the RLC protocol in CU (e.g., Automatic Retransmission Request (ARQ) function), while hosting the remaining parts of the RLC protocol in the DU, together with MAC and PHY. In some exemplary embodiments, CU can host RRC and PDCP, where PDCP can handle both UP traffic and CP traffic. Nevertheless, other exemplary embodiments may utilize other protocol splits that by hosting certain protocols in CU and certain others in the DU. Exemplary embodiments can also locate centralized control plane protocols (e.g., PDCP-C and RRC) in a different CU with respect to the centralized user plane protocols (e.g., PDCP-U).

3GPP RAN WG3 has also stared working on a new open interface—referred to as "E1"—between the control plane (CU-CP) and the user plane (CU-UP) parts of CU. The related agreements are collected in TR 38.830 and discussed further below.

In the architecture identified by CUs and DUs, DC can be achieved by means of allowing a UE to connect to multiple DUs served by the same CU or by allowing a UE to connect to multiple DUs served by different CUs. As illustrated in FIG. 1, a gNB can include a gNB-CU connected to one or more gNB-DUs via respective F1 interfaces, all of which are described hereinafter in greater detail. In the NG-RAN architecture, however, a gNB-DU can be connected to only a single gNB-CU.

The NG-RAN is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB can be connected to all 5GC nodes within a "pool area," as defined in 3GPP TS 23.501. If security protection for control plane and user plane data on TNL of NG-RAN interfaces has to be supported, NDS/IP (3GPP TS 33.401) shall be applied.

Furthermore, in some exemplary configuration, each gNB can be connected to all Access and Mobility Management Functions (AMFs) within an AMF Region. The AMF Region is defined in 3GPP TS 23.501 as consisting of one or more AMF Sets, each AMF Set consisting of some AMFs that serve a given area and Network Slice, which is defined generically in 23.501 as a logical network that provides specific capabilities and characteristics.

As mentioned above, multi-connectivity (e.g., dual-connectivity or "DC") is envisioned as an important feature to be supported in RAN 5G architectures. In this context, DC support includes establishing master node (MN) and secondary nodes (SNs) and distributing UP traffic to the MN and SNs according to optimal, preferred, and/or desirable traffic and radio resource management techniques. CP traffic is assumed to terminate in one node only, i.e. the MN.

FIGS. 2 and 3 show the protocol and interfaces involved in DC, as described in 3GPP TS 38.300 v0.6.0. FIG. 2 illustrates that a Master gNB (MgNB) can provide a Master Cell Group (MCG) bearer and a MCG split bearer, whereby the MgNB can forward PDCP bearer traffic to a Secondary gNB (SgNB) via Xn. In addition to PDCP, each of the bearer types can utilize various other protocols mentioned above. FIG. 3 illustrates that the SgNB can provide a Secondary Cell Group (SCG) bearer and an SCG split bearer, whereby the SgNB can forward PDCP bearer traffic to the MgNB via Xn. In addition to PDCP, each of the bearer types can utilize various other protocols mentioned above. In some exemplary embodiments, the MgNB and/or SgNB can utilize the RAN split architecture (e.g., CU and DU) discussed above.

Furthermore, dual connectivity using multiple radio access technologies (multi-RAT DC or MR-DC, for short) is envisioned as an important feature in 5G RAN architectures to deliver enhanced end-user bit rate. In MR-DC, both Long-Term Evolution (LTE, also known as "4G") and NR RATs concurrently provide radio resources toward the UE. When MR-DC is applied, the MN can anchor the control plane (CP) towards the CN, while the SN can provide control and user plane resources to the UE via coordination with the MN. FIG. 4 (from 3GPP TS 37.340) shows an exemplary CP protocol architecture for MR-DC, in which the UE receives RRC messages from both MN and SN but only adopts an RRC state based on the MN. Within the MR-DC user plane (UP), various bearer types are available. FIG. 5 (also from TS 37.340) shows an exemplary MR-DC UP protocol architecture including an exemplary MCG bearer, MCG split bearer, SCG bearer, and SCG split bearer. The split-bearer communication occurs via the Xn interface, and each of the bearer types shown can utilize various protocols mentioned above.

Although the figures and discussion above are in the context of 5G, NG-RAN nodes can provide both NR access via gNB functionality and E-UTRA/LTE access via via evolved Node B (eNB) functionality. Many features for connectivity, mobility, support of QoS, etc. apply for both NR/5G and E-UTRA/LTE access. As such, any feature described for gNBs can also apply to eNBs, which are often referred to in this context as "ng-eNB." For example, it is anticipated that higher/lower layer split described above for gNBs will also be used for ng-eNBs.

Furthermore, in the context of 5G/NR, a connectivity option (identified in 38.301 as "option 3") is specified to support DC between a node providing E-UTRA resources (e.g., LTE eNB) and a node providing NR resources (e.g., gNB). This connectivity option can also be referred to as E-UTRAN-NR Dual Connectivity (or EN-DC for short). In this arrangement, an LTE eNB acts as MN (CP anchor) and the NR gNB acts as SN (providing additional UP resources). FIGS. 6 and 7 show exemplary control plane (CP) and user plane (UP) connectivity, respectively, between the LTE MN, the NR SN, and the EPC. As illustrated in FIGS. 6 and 7, EN-DC supports CP connectivity from RAN nodes towards the EPC (e.g., MME) via the S1 interface, and UP connectivity from the eNB/gNB towards the EPC via the S1-U interface. The interface between eNB and gNB can be an X2 interface.

Alternately, when the 5G Core Network (5GC, alternately referred to as NGC) serves the UE, an LTE eNB and an NR gNB can be connected via an Xn interface, which can comprise Xn-U and Xn-C portions for UP and CP, respectively. One of the features of Rel-15 LTE (also referred to as "eLTE") is that eNBs can connect to the 5GC via the NG interface, which can comprise NG-U and NG-C portions for UP and CP, respectively. Various DC options between the eNB and gNB are also available in this architecture, such that the MN can be either the eNB or the gNB. FIG. 8 illustrates exemplary MR-DC connectivity with the NGC and an eLTE eNB MN, referred to as "option 7" in 3GPP TR 38.801 In this arrangement, SN UP traffic flows to the NGC either directly (as shown on right) or via the MN (as shown on left).

"Slicing" is a central concept in 5G networks with new mechanisms introduced in 5GC and "slicing" mechanisms also available in 4G EPC. Although "Network Slicing" is defined generically in 23.501, discussed above, the term "slicing" is used herein to refer to techniques that minimize impact between groups of users that are sharing a pool of network resources (e.g., radio resources), based on policies for how many resources can be consumed by each group of users during overload conditions on the network resources. Exemplary radio resource management policies for groups include limiting the amount of resources consumed by inbound roaming usings in a congested cell, and controlling the proportion of resources available for public safety users versus consumer (e.g., Mobile Broadband) users.

Even so, there are various problems, drawbacks, and/or issues related to identifying groups of users that can prevent and/or inhibit the deployment of EN-DC for networks that employ slicing.

SUMMARY

Accordingly, exemplary embodiments of the present disclosure address these shortcomings in dual-connectivity (DC) implementations in mixed NR and LTE networks, thereby facilitating group-level radio resource management for both RATs and/or RANs. Such exemplary embodiments can include methods and/or procedures performed by a first network node (e.g., eNB or gNB) in a RAN (e.g., LTE/E-UTRAN or NR/NG-RAN). The first network node can be in communication with a second network node (e.g., gNB or eNB) having a different radio access technology (RAT) than the first network node.

The exemplary methods and/or procedures can include determining one or more radio resource management (RRM) identifiers associated with at least one of: a user equipment (UE) served by the first network node; a subscriber associated with the UE; and a group of UEs served by the first network node. In some embodiments, determining the RRM identifiers can include receiving the RRM identifiers from a core network.

The exemplary methods and/or procedures can also include sending a request for the second network node to establish dual connectivity, as a secondary node (SN), with the UE, wherein the request comprises information relating to the one or more group identifiers. In some embodiments, the exemplary methods and/or procedures can also include managing the UE's access to resources of the RAN based on the one or more group identifiers. In some embodiments, the first network node can manage the UE's access to resources of the RAN further based on a profile of the subscriber associated with the UE. In some embodiments, the information relating to the one or more RRM identifiers can map to one or more further policies for managing UE access to resources provided by a RAN that includes the second network node. In some embodiments, the one or more policies can be the same as the one or more further policies.

Other exemplary embodiments can include methods and/or procedures performed by a second network node (e.g., gNB or eNB) in a RAN (e.g., NR/NG-RAN or LTE/E-UTRAN). The second network node can be in communication with a first network node (e.g., eNB or gNB) having a different RAT than the second network node. The exemplary methods and/or procedures can include receiving a request from a first network node to establish dual connectivity, as a secondary node (SN), with a user equipment (UE) served by the first network node, wherein the request comprises information relating to one or more Radio Resource Management (RRM) identifiers that are associated with at least one of: a user equipment (UE) served by the first network node; a subscriber associated with the UE; and a group of UEs served by the first network node.

The exemplary methods and/or procedures can also mapping the information relating to the one or more RRM identifiers to one or more policies for managing the UE's access to resources provided by the second network node. The exemplary method and/or procedure can also include managing the UE's access to the resources in accordance with the one or more policies. In some embodiments, the one or more RRM identifiers can map to one or more further policies for managing UE access to resources provided by a RAN that includes the first network node. In some embodiments, the one or more policies can be the same as the one or more further policies.

Other exemplary embodiments can also include network nodes (e.g., eNBs, gNBs, base stations, etc., or components thereof such as gNB-CU and/or gNB-DU) configured to perform operations corresponding to the exemplary methods and/or procedures. Other exemplary embodiments can also include non-transitory, computer-readable media storing computer-executable instructions that, when executed by a processing unit of a network node, configure the network node to perform the operations corresponding to the exemplary methods and/or procedures.

BRIEF DESCRIPTION OF THE FIGURES

FIG. 11, comprising FIGS. 11A and 11B, shows an exemplary format of an SgNB Addition Request message, according to some exemplary embodiments of the present disclosure.

FIG. 19-22 are flow diagrams illustrating various exemplary methods and/or procedures implemented in a communication system, according to various exemplary embodiments of the present disclosure.

DETAILED DESCRIPTION

Figure 1:
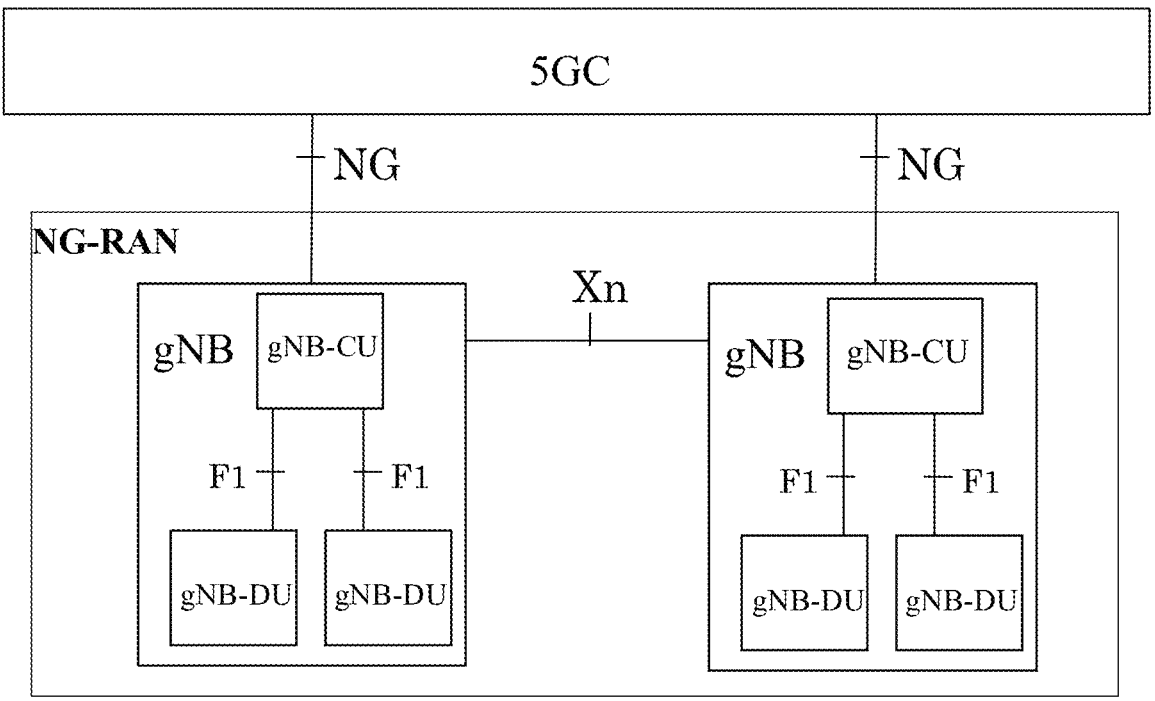
FIG. 1 illustrates a high-level view of the 5G network architecture, consisting of a Next Generation RAN (NG-RAN) and a 5G Core (5GC).
Figure 2:
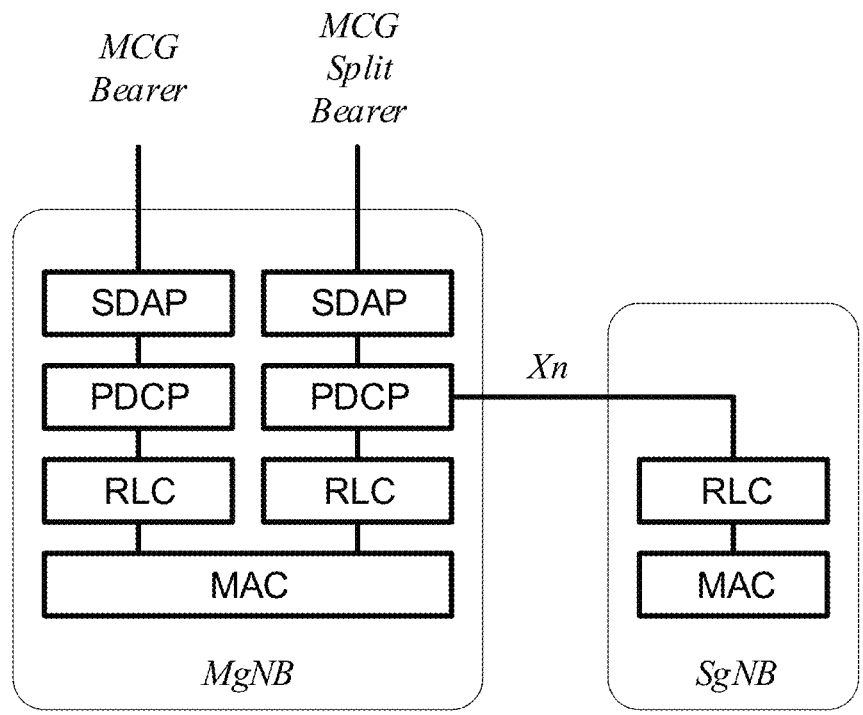
FIGS. 2 and 3 show exemplary protocols and interfaces utilized in dual connectivity (DC) involving a master gNB (MgNB) and a secondary gNB (SgNB).
Figure 3:
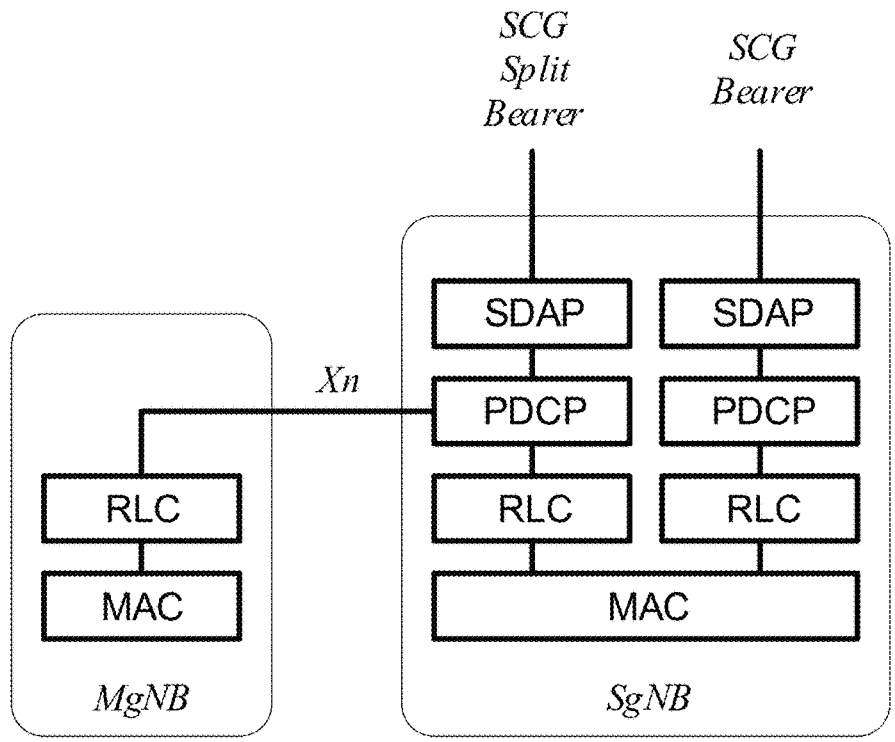
Figure 4:
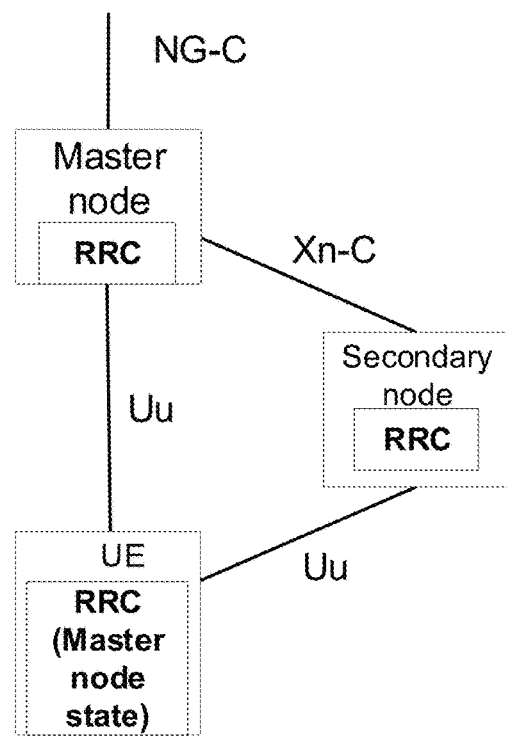
FIG. 4 shows an exemplary control-plane (CP) protocol architecture for 5G multi-RAT DC.
Figure 5:
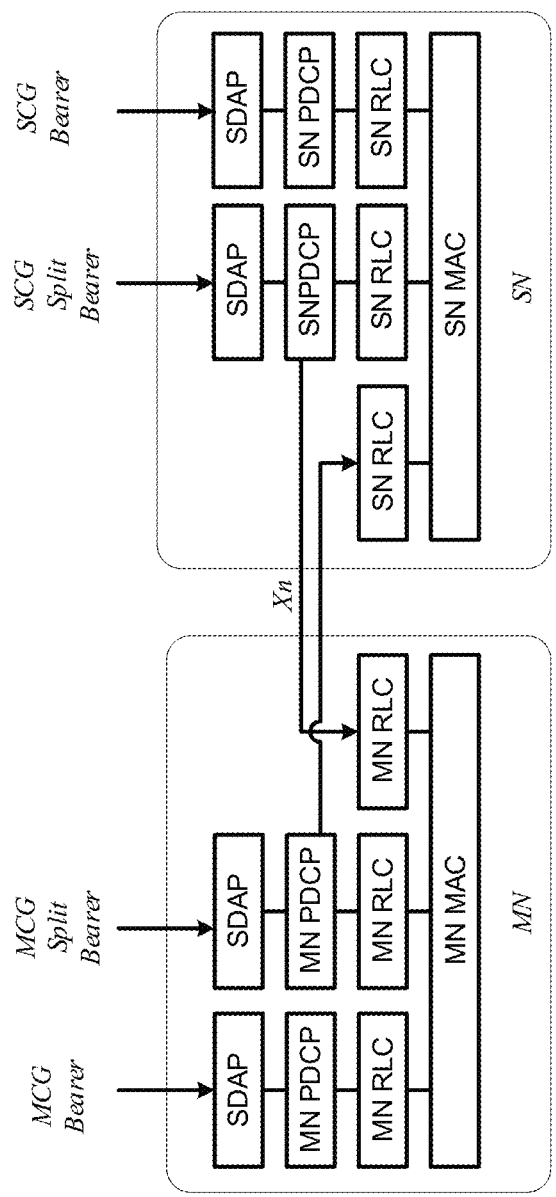
FIG. 5 shows an exemplary user-plane (UP) protocol architecture for 5G multi-RAT DC.
Figure 6:
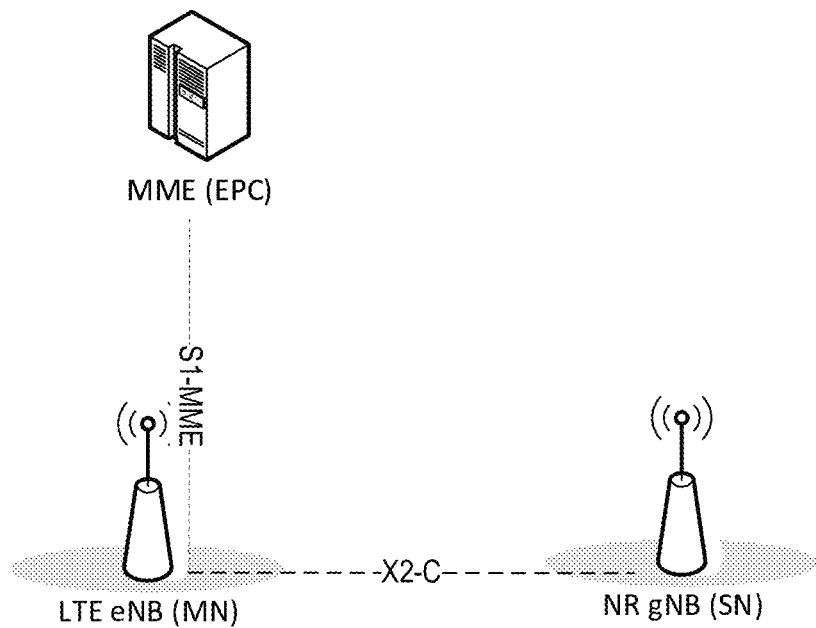
FIGS. 6 and 7 show exemplary CP and UP connectivity, respectively, in a MR-DC scenario involving a master eNB, a secondary gNB, and an Evolved Packet Core (EPC) network.
Figure 7:
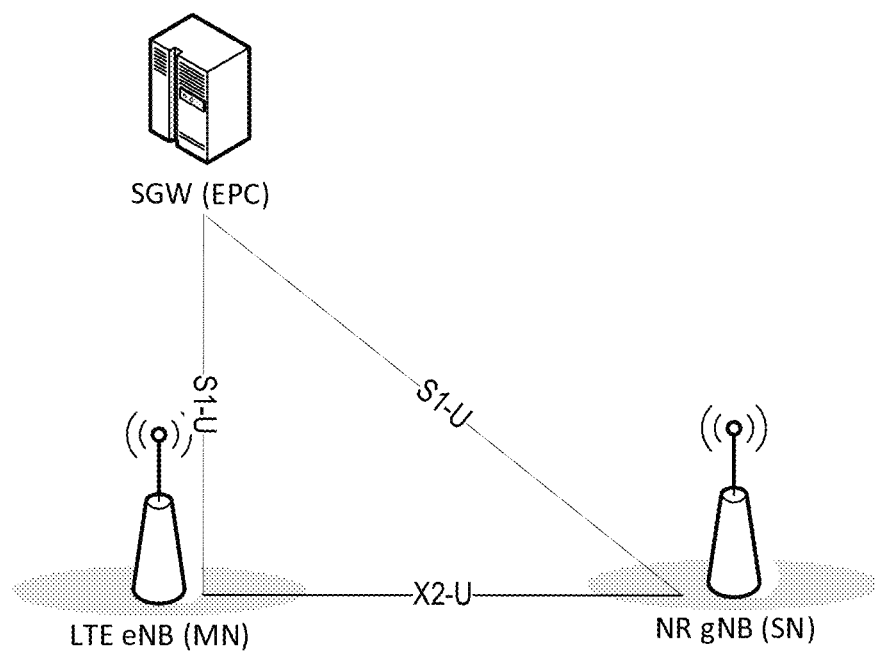
Figure 8:
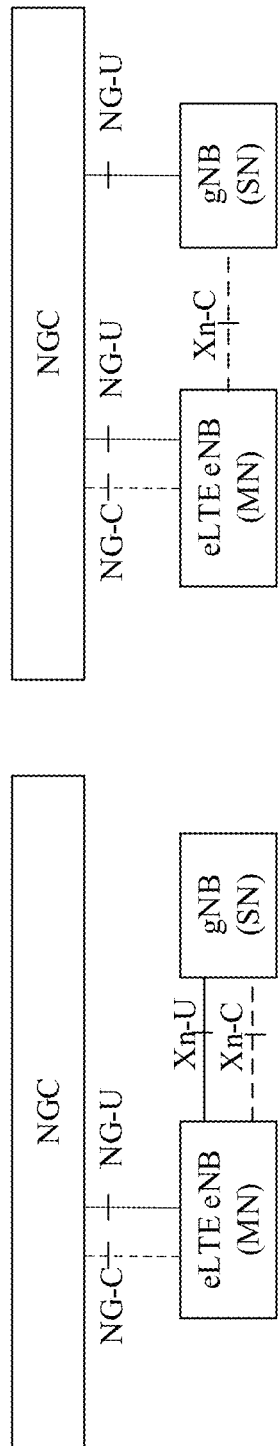
FIG. 8 shows exemplary CP and UP connectivity in a MR-DC scenario involving a master eNB, a secondary gNB, and a 5GC (NGC) network.

Exemplary embodiments briefly summarized above will now be described more fully with reference to the accompanying drawings. These descriptions are provided by way of example to explain the subject matter to those skilled in the art, and should not be construed as limiting the scope of the subject matter to only the embodiments described herein. More specifically, examples are provided below that illustrate the operation of various embodiments according to the advantages discussed above.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiment, and vice versa. Other objectives, features and advantages of the disclosed embodiments will be apparent from the following description.

Exemplary embodiments of the present disclosure are described in terms of an LTE eNB in the role of MN and an NR gNB in the role of SN. Nevertheless, this is merely for the purposes of illustrating features, benefits, and/or underlying principles. As such, a person skilled in the art will readily comprehend that the features, benefits, and/or principles apply equally to other embodiments in which a gNB is MN and the SN is an eNB or another gNB. Furthermore, such features, benefits, and/or principles can also apply to when the SN is a node in a non-3GPP radio access network (RAN).

Furthermore, although the descriptions below are given in terms of specific group identifiers (e.g., SPID), these are merely exemplary and other group identifiers can be utilized in the same or substantially similar manner. Moreover, information related to, or representing, such group identifiers can also be communicated instead of the specifically-mentioned group identifiers. For example, rather than communicating an SPID from MN to SN, such information may be conveyed as an RFSP when the SN is connected to the 5GC.

As mentioned above, there are various problems, drawbacks, and/or issues related to identifying groups of users that can prevent and/or inhibit the deployment of EN-DC for networks that employ slicing. These are discussed in more detail below.

Policies for "slicing" in LTE (e.g., E-UTRAN and EPC) can be based on one or a combination of the following identifiers related to user, groups, and/or networks:
  Public Land Mobile Network ID (PLMN-id) (e.g., "network sharing");
  Quality of Service (QoS) Class Identifier (QCI);
  Subscribers Profile ID for RAT/Frequency Priority (SPID) (e.g., inbound roamers are assigned a certain SPID);
  Dedicated Core Network ID (DCN-id) (e.g., users belonging to the public safety DCN shall be treated according to a certain policy);
  MME Group Identity (MMEGI); and/or
  Membership of a Closed Subscriber Group (CSG).

Figure 9:
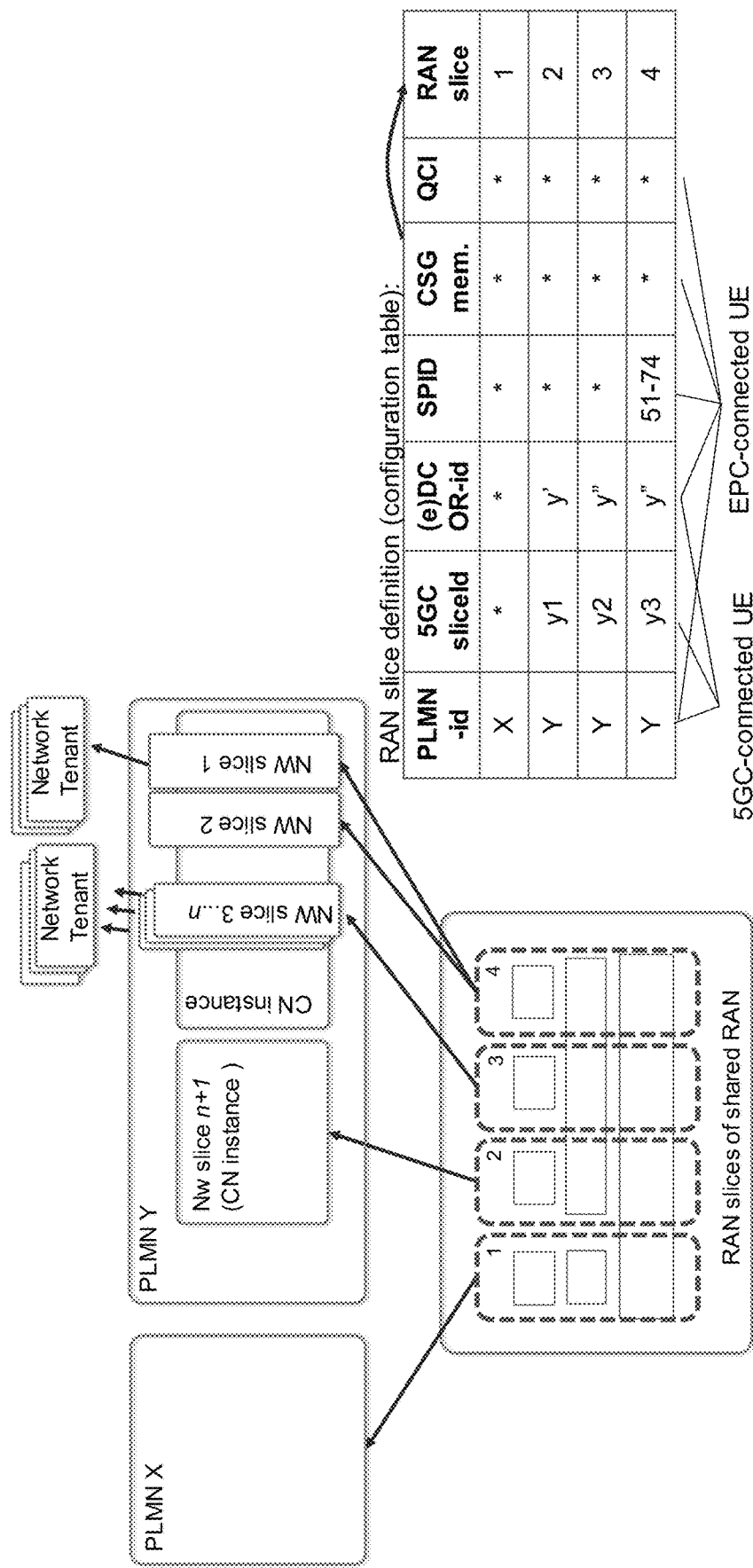
FIG. 9 illustrates examples of how different "slices" of an LTE RAN (e.g., E-UTRAN) can be identified based on various identifiers.
Figure 10:
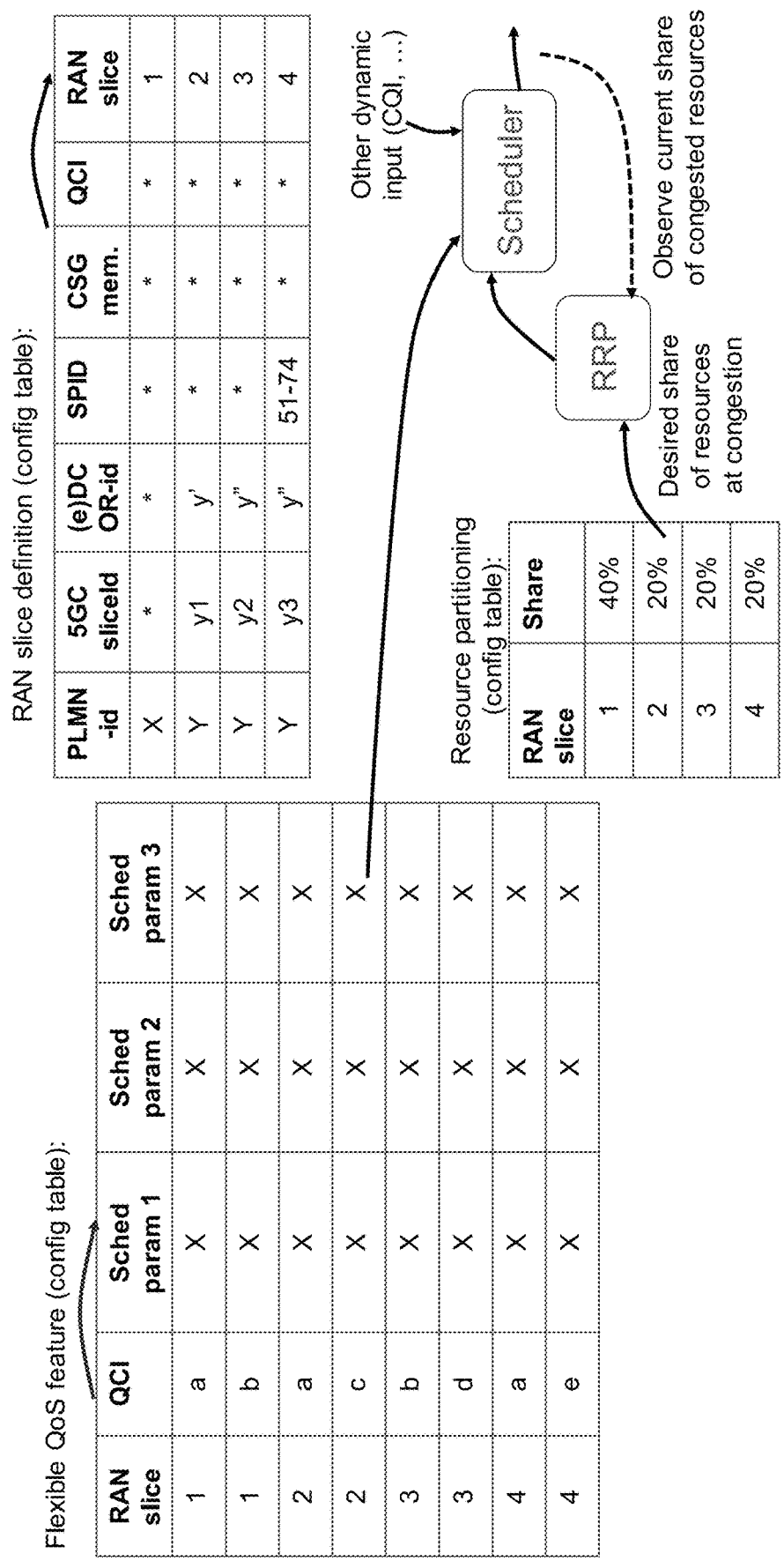
FIG. 10 further illustrates how these various identifiers can be applied to RAN resource scheduling according to particular policies.

In LTE, all identifiers and information received from the EPC are available to the eNB, and can be used for network resource management ("slicing") between groups of users. FIG. 9 illustrates examples of how different "slices" of a RAN (e.g., E-UTRAN) can be identified based on various identifiers, including the ones mentioned above. More specifically, two public land mobile networks (PLMNs) X and Y utilize four different slices of a shared RAN. PLMN X utilizes RAN slice 1, which two core network (CN) instances in PLMN Y utilize RAN slices 2-4. The RAN slice definition/configuration table shows various exemplary identifiers associated with each of these RAN slices. FIG. 10 further illustrates how the four RAN slices shown in FIG. 9 can be associated with various scheduling parameters (e.g., via a flexible QoS feature table) that can be applied to RAN resource scheduling according to particular radio resource policies (RRP) and RAN resource partitioning shares.

It is expected that initial 5G deployments will use EN-DC, with LTE eNB as MN (e.g, MeNB) and with an interface to the 4G EPC. In such case, a NR gNB is SN (e.g., SgNB) and, as such, receives requests to establish resources over X2 from the MeNB. A general principle is that LTE resources are managed by the MeNB, while the SgNB has a large degree of autonomy in managing NR resources. Nevertheless, although there are many possible identifiers could be used as basis for group-level radio resource management according to a policy ("slicing") in EN-DC, the MN (e.g., MeNB) only sends a subset of these identifiers to the SN (e.g., SgNB), in particular the UE PLMN-id and QCI per bearer. For example, the UE's SPID and DCN-id are not available over the X2 (or Xn) interface. As such, this lack of information prevents the NR RAN (e.g., gNB) from controlling network resources according the same range of policies available to the LTE RAN (e.g., eNB). In short, the possibilities for slicing of NR resources are limited compared to what is possible for LTE.

In some exemplary embodiments, when the MN (e.g., MeNB) has received or determined an SPID group identifier from the EPC, it forwards it in an SN Setup Request (e.g. X2: SgNB Addition Request message) to the SN (e.g., SgNB). In some exemplary embodiments, when the MN has received or determined a valid DCN-id group identifier for the UE, it forwards it in the SN Setup Request to the SN. In some embodiments, both SPID and DCN-id can be sent in the same SN Setup Request message.

In other exemplary embodiments, the MN can perform an operator-configurable mapping of a group identifier to other information relating to the group identifier (e.g., a new parameter). For example, the MN can map the DCN-id to a "DCN resource index" and send this to the SN. Such a mapping can serve the purpose of abstracting information about the CN connected to the MN, so as not to expose such information to the SN. Rather, mapping the DCN-id to an index can facilitate providing the SN with only the information needed to understand the index values and how they map to a specific policy for the UE.

When the SgNB receives a SN setup request with SPID and/or a DCN-related parameter, it can use this for management of NR resources according to an operator-configured policy. As an example, if the SPID and or DCN-ID identify a policy for which a predefined pool of resources can be used by the UE, the SN can enable such policy and, e.g., prioritize the UE's access to resources of the NR RAN, over access by other UEs that are not associated by the identified policy (e.g., not identified by the SPID and/or DCN-id and/or related parameters).

More generally, the SN can use any combination of SPID, DCN-related information, PLMN-id, QCI, CSG membership, etc. to define groups of users and/or an appropriate resource management policy that relates to the UE's active services and/or services identified with the profile of a subscriber associated with the UE. For example, in the context of NR resource scheduling (e.g., in an NR scheduler), the SN can guarantee that a particular group of users—defined in any of the ways described above—can access a predefined proportion of resources (e.g., radio resources) that can be allocated by the SN. In other words, when there is no congestion in the NR RAN, resources can be assigned to any user regardless of this policy. On the other hand, when congestion occurs in the NR RAN, the defined group of users can receive, upon request, the predetermined proportion of resources in the NR RAN. In other words, the defined group of users is prioritized over other users who are not included in the defined group.

In other exemplary embodiments, the SN can also use policies per group of users for other NR resource management tasks. For example, the NR RAN allocates frequency-domain resources based on division into multiple bandwidth parts (BWPs) that cover the available frequency spectrum. Accordingly, the SN can prioritize access to the various BWPs and/or frequency ranges within the various BWPs based on membership in the defined groups.

Various group information for a particular UE can be sent from the MN to the SN in various ways. In one exemplary embodiment, SPID information can be encoded in an SgNB Addition Request message sent by the MN (e.g., MeNB) to request the preparation of resources for EN-DC operation for a specific UE. FIG. 11, comprising FIGS. 11A and 11B, shows an exemplary format of an SgNB Addition Request message, according to some exemplary embodiments of the present disclosure. In other exemplary embodiments, other messages such as SgNB Modification Request can be used to carry various types of group information for a particular UE.

In other exemplary embodiments, the SN can be arranged in a split configuration comprising a a Central Unit (CU) hosting higher layers such as RRC/PDCP and a Distributed Unit (DU) hosting lower layers such as RLC/MAC/PHY, as described briefly above. For example, the SN can be arranged as a gNB-CU and a gNB-DU. In such embodiments, after receiving information relating to one or more group identifier (e.g., SPID, RFSP, DCN-id, etc.) from the MN over an Xn interface, the gNB-CU can forward all, or a portion of, the received information to the gNB-DU over the F1 interface. Such information can be useful for group-based radio resource management (RRM) policies that are implemented by, or involve, a scheduler functionality resident in the gNB-DU. Exemplary F1 messages that could be suitable for providing such information include: UE Context Setup Request, UE Context Modification Request, and DL RRC Message Transfer. Although described in terms of NR split architecture, such embodiments can also be utilized in LTE split architectures, in which an eNB SN (e.g., SeNB) is divided into an eNB-CU and an eNB-DU. Messages appropriate for the eNB-CU/eNB-DU interface can be employed in a similar manner as described above for NR split architectures.

These and other exemplary embodiments can provide various advantages related to radio resource management in dual connectivity scenarios that are expected to be important for deployment of NR networks. More specifically, such embodiments facilitate "slicing" of radio resources in dual-connectivity scenarios in which a master node (MN) deploying a first RAT (e.g., LTe) and a secondary node (SN) deploying a different second RAT (e.g., NR). The MN and the SN can be part of different RANs, or different portions of a single RAN that deploys two different RATs.

By providing group-related identifiers associated with a UE when initiating dual-connectivity with the SN, such embodiments facilitate at least the same degree of "slicing" in the RAN (or portion) including the second network node as in the RAN (or portion) including the first network node. This can facilitate the deployment of 5G/NR networks to provide additional data capacity to legacy LTE networks via dual-connectivity techniques. These and other advantages and/or benefits can facilitate more timely design, implementation, and deployment of 5G/NR solutions. Furthermore, these and other advantages and/or benefits can lead to improvements in capacity, throughput, latency, etc. that are envisioned by 5G/NR and are important for the growth of over-the-top (OTT) data applications or services external to the 5G network. Moreover, these and other advantages and/or benefits can also lead to improved user experience associated with OTT data applications or services, particularly with respect to service mobility within the 5G network.

Figure 12:
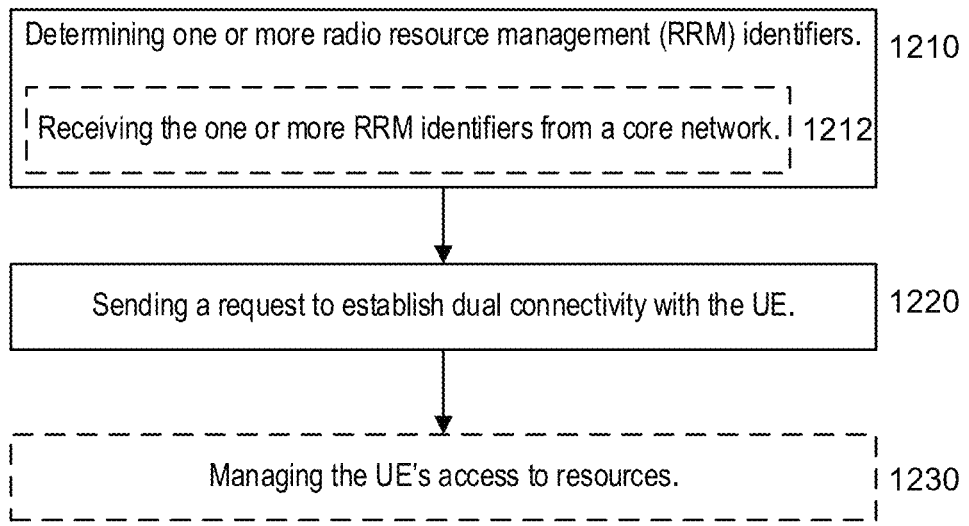
FIG. 12 shows an exemplary method and/or procedure performed by a first network node (e.g., eNB) in a radio access network (RAN, e.g., E-UTRAN), according to various exemplary embodiments of the present disclosure.
Figure 13:
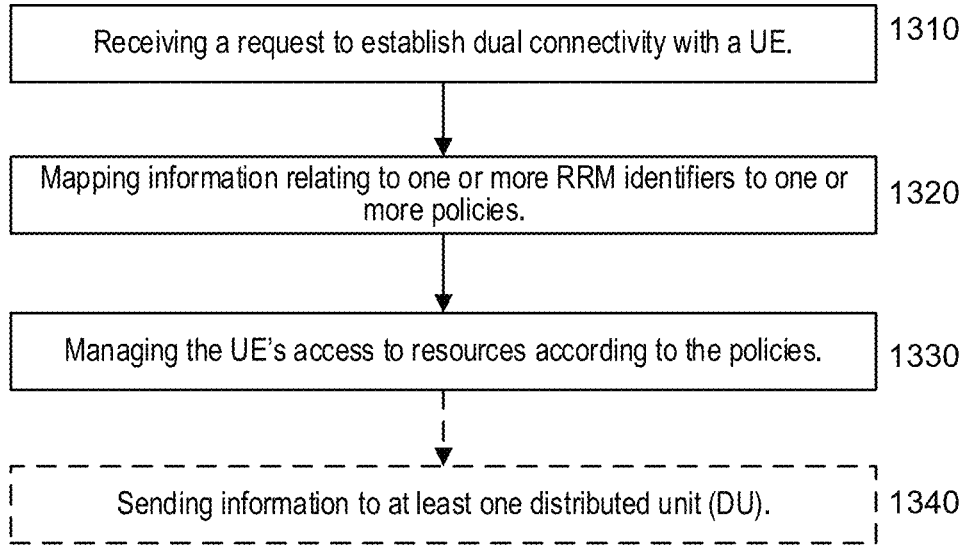
FIG. 13 shows an exemplary method and/or procedure performed by a second network node (e.g., gNB) in a RAN (e.g., NG-RAN), according to various exemplary embodiments of the present disclosure.

FIG. 12 illustrates an exemplary method and/or procedure performed by a first network node (e.g., eNB) in a radio access network (RAN), in accordance with various exemplary embodiments of the present disclosure. The first network node can be in communication with a second network node (e.g., gNB) having a different radio access technology (RAT) than the first network node. Although the exemplary method and/or procedure is illustrated in FIG. 12 by blocks in a particular order, this order is exemplary and the operations corresponding to the blocks can be performed in different orders, and can be combined and/or divided into blocks having different functionality than shown in FIG. 12. Furthermore, exemplary method and/or procedure shown in FIG. 12 can be complimentary to exemplary method and/or procedure illustrated in FIG. 13 below. In other words, exemplary methods and/or procedures shown in FIGS. 12 and 13 are capable of being used cooperatively to provide the benefits, advantages, and/or solutions to problems described hereinabove. Optional operations are indicated by dashed lines.

The exemplary method and/or procedure can include the operations of block 1210, where the first network node can determine one or more radio resource management (RRM) identifiers associated with at least one of: a user equipment (UE) served by the first network node; a subscriber associated with the UE; and a group of UEs served by the first network node. In some embodiments, the operations of block 1210 can include the operations of block 1212, where the first network node can receive the one or more RRM identifiers from a core network (e.g., a 5GC or an EPC).

The exemplary method and/or procedure can also include the operations of block 1220, where the first network node can send a request for the second network node to establish dual connectivity, as a secondary node (SN), with the UE, wherein the request comprises information relating to the one or more RRM identifiers. In some embodiments, the exemplary method and/or procedure can also include the operations of block 1230, where the first network node can manage the UE's access to resources of the RAN based on the one or more RRM identifiers. In some embodiments, the first network node can manage the UE's access to resources of the RAN further based on a profile of the subscriber associated with the UE. In some embodiments, the information relating to the one or more RRM identifiers can map to one or more further policies for managing UE access to resources provided by a RAN that includes the second network node. In some embodiments, the one or more policies can be the same as the one or more further policies.

In some embodiments, each of the one or more RRM identifiers can be related to one or more of the following: Subscribers Profile ID for RAT/Frequency Priority (SPID), Dedicated Core Network ID (DCN-id), Public Land Mobile Network ID (PLMN-id), Mobility Management Entity group identity (MMEGI), QoS Class Indicator (QCI), and Closed Subscriber Group (CSG) membership.

In some embodiments, the first network node can be an eNB configured with an LTE RAT, and the second network node can be a gNB configured with an NR RAT. In other embodiments, the second network node can be an eNB configured with an LTE RAT, and the first network node can be a gNB configured with an NR RAT.

In some embodiments, the one or more RRM identifiers can include a Subscriber Profile ID for RAT/Frequency Priority (SPID), and the information relating to the one or more RRM identifiers can include the SPID. In some embodiments, the one or more RRM identifiers can include a RAT/Frequency Selection Priority (RFSP), and the information relating to the one or more RRM identifiers can include the RFSP. In some embodiments, the one or more RRM identifiers can include an SPID, and the information relating to the one or more RRM identifiers can include a RFSP index.

In some embodiments, the one or more RRM identifiers can include a Dedicated Core Network ID (DCN-id) and/or a Mobility Management Entity group identity (MMEGI). In such embodiments, the information relating to the one or more group identifiers can include an index value that maps to one or more policies for managing UE access to resources of a RAN that includes the second network node.

FIG. 13 illustrates an exemplary method and/or procedure performed by a second network node (e.g., gNB) in a radio access network (RAN), in accordance with various exemplary embodiments of the present disclosure. The second network node can be in communication with a first network node (e.g., eNB) having a different radio access technology (RAT) than the second network node. Although the exemplary method and/or procedure is illustrated in FIG. 13 by blocks in a particular order, this order is exemplary and the operations corresponding to the blocks can be performed in different orders, and can be combined and/or divided into blocks having different functionality than shown in FIG. 13. Furthermore, exemplary method and/or procedure shown in FIG. 13 can be complimentary to exemplary method and/or procedure illustrated in FIG. 12 above. In other words, exemplary methods and/or procedures shown in FIGS. 12 and 13 are capable of being used cooperatively to provide the benefits, advantages, and/or solutions to problems described hereinabove. Optional operations are indicated by dashed lines.

The exemplary method and/or procedure can include the operations of block 1310, where the second network node can receive a request from a first network node to establish dual connectivity, as a secondary node (SN), with a user equipment (UE) served by the first network node, wherein the request comprises information relating to one or more Radio Resource Management (RRM) identifiers that are associated with at least one of: a user equipment (UE) served by the first network node; a subscriber associated with the UE; and a group of UEs served by the first network node. The exemplary method and/or procedure can also include the operations of block 1320, where the second network node may map the information relating to the one or more RRM identifiers to one or more policies for managing the UE's access to resources provided by the second network node. In some embodiments, the one or more RRM identifiers can map to one or more further policies for managing UE access to resources provided by a RAN that includes the first network node. In some embodiments, the one or more policies can be the same as the one or more further policies.

The exemplary method and/or procedure can include the operations of block 1330, where the second network node can manage the UE's access to the resources in accordance with the one or more policies. In some embodiments, the second network node can manage the UE's access to the resources further based on a profile of the subscriber associated with the UE. In some embodiments, at least one of the policies can prioritize access by UEs associated with the one or more RRM identifiers over access by UEs that are not associated with all of the one or more identifiers. In some embodiments, such a policy can prioritize access by UEs associated with the one or more group identifiers to particular bandwidth part (BWP) frequency resources that are allocated by the second network node. In some embodiments, at least one of the policies can guarantee that UEs associated with the one or more RRM identifiers can access at least a predefined proportion of resources available from the RAN.

In some embodiments, each of the one or more RRM identifiers can be related to one or more of the following: Subscribers Profile ID for RAT/Frequency Priority (SPID), Dedicated Core Network ID (DCN-id), Public Land Mobile Network ID (PLMN-id), Mobility Management Entity group identity (MMEGI), QoS Class Indicator (QCI), and Closed Subscriber Group (CSG) membership.

In other embodiments, the second network node can be an eNB configured with an LTE RAT, and the first network node can be a gNB configured with an NR RAT. In other embodiments, the first network node can be an eNB configured with an LTE RAT, and the second network node can be a gNB configured with an NR RAT. In such embodiments, the gNB second network node can comprise a central unit (CU) and one or more distributed units (DUs). In such embodiments, the request can be received (in block/operation 1310) by the CU, and the exemplary method and/or procedure can also include sending (in block/operation 1340) at least one of the following to at least one DU: the information relating to the one or more RRM identifiers; and the one or more policies. This information can be sent, e.g., via an F1 interface between the DU(s) and CU.

In some embodiments, if the information relating to the one or more identifiers is sent to the DU(s), the operation of block 1340 can be part of block 1320. In some embodiments, if the one or more policies are sent to the DU(s), the operation of block 1340 can be part of block 1330. Other combinations and/or arrangements are also possible.

In some embodiments, the one or more RRM identifiers can include a Subscriber Profile ID for RAT/Frequency Priority (SPID), and the information relating to the one or more RRM identifiers can include the SPID. In some embodiments, the one or more RRM identifiers can include a RAT/Frequency Selection Priority (RFSP), and the information relating to the one or more RRM identifiers can include the RFSP. In some embodiments, the one or more RRM identifiers can include an SPID, and the information relating to the one or more RRM identifiers can include a RFSP index.

In some embodiments, the one or more RRM identifiers can include a Dedicated Core Network ID (DCN-id) and/or a Mobility Management Entity group identity (MMEGI). In such embodiments, the information relating to the one or more group identifiers can include an index value that maps to one or more policies for managing UE access to resources of a RAN that includes the second network node.

Figure 14:
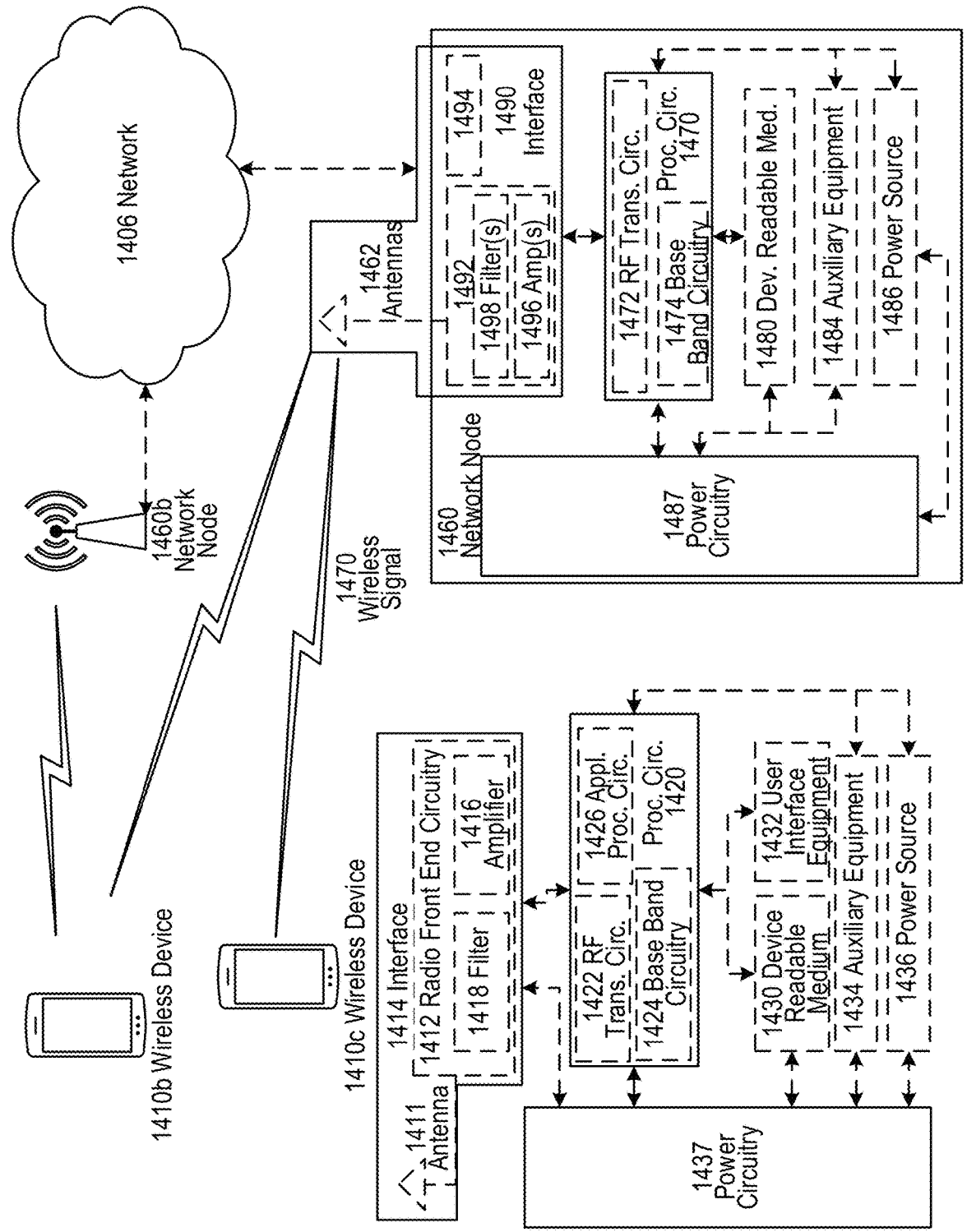
FIG. 14 is a block diagram of an exemplary wireless network configurable according to various exemplary embodiments of the present disclosure.

Although the subject matter described herein can be implemented in any appropriate type of system using any suitable components, the embodiments disclosed herein are described in relation to a wireless network, such as the example wireless network illustrated in FIG. 14. For simplicity, the wireless network of FIG. 14 only depicts network 1430, network nodes 1460 and 1460b, and WDs 1410, 1410b, and 1410c. In practice, a wireless network can further include any additional elements suitable to support communication between wireless devices or between a wireless device and another communication device, such as a landline telephone, a service provider, or any other network node or end device. Of the illustrated components, network node 1460 and wireless device (WD) 1410 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 810.11 standards; and/or any other appropriate wireless communication standard, such as the Worldwide Interoperability for Microwave Access (WiMax), Bluetooth, Z-Wave and/or ZigBee standards.

Network 1430 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1460 and WD 1410 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

As used herein, network node can refer to equipment capable, configured, arranged, and/or operable to communicate directly or indirectly with a wireless device and/or with other network nodes or equipment in the wireless network, thereby to facilitate, enable, and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 14, network node 1460 includes processing circuitry 1470, device readable medium 1480, interface 1490, auxiliary equipment 1484, power source 1486, power circuitry 1487, and antenna 1462. Although network node 1460 illustrated in the example wireless network of FIG. 14 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1460 are depicted as single boxes located within a larger box, or nested within multiple boxes, in practice, a network node can comprise multiple different physical components that make up a single illustrated component (e.g., device readable medium 1480 can comprise multiple separate hard drives as well as multiple RAM modules).

Similarly, network node 1460 can be composed of multiple physically separate components (e.g., a NodeB component and a RNC component, or a BTS component and a BSC component, etc.), which can each have their own respective components. In certain scenarios in which network node 1460 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1460 can be configured to support multiple radio access technologies (RATs). In such embodiments, some components can be duplicated (e.g., separate device readable medium 1480 for the different RATs) and some components can be reused (e.g., the same antenna 1462 can be shared by the RATs). Network node 1460 can also include multiple sets of the various illustrated components for different wireless technologies integrated into network node 1460, such as, for example, GSM, WCDMA, LTE, NR, WiFi, or Bluetooth wireless technologies. These wireless technologies can be integrated into the same or different chip or set of chips and other components within network node 1460.

Processing circuitry 1470 can be configured to perform any determining, calculating, or similar operations (e.g., certain obtaining operations) described herein as being provided by a network node. These operations performed by processing circuitry 1470 can include processing information obtained by processing circuitry 1470 by, for example, converting the obtained information into other information, comparing the obtained information or converted information to information stored in the network node, and/or performing one or more operations based on the obtained information or converted information, and as a result of said processing making a determination.

Processing circuitry 1470 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1460 components, such as device readable medium 1480, network node 1460 functionality. For example, processing circuitry 1470 can execute instructions stored in device readable medium 1480 or in memory within processing circuitry 1470. Such functionality can include providing any of the various wireless features, functions, or benefits discussed herein. In some embodiments, processing circuitry 1470 can include a system on a chip (SOC).

In some embodiments, processing circuitry 1470 can include one or more of radio frequency (RF) transceiver circuitry 1472 and baseband processing circuitry 1474. In some embodiments, radio frequency (RF) transceiver circuitry 1472 and baseband processing circuitry 1474 can be on separate chips (or sets of chips), boards, or units, such as radio units and digital units. In alternative embodiments, part or all of RF transceiver circuitry 1472 and baseband processing circuitry 1474 can be on the same chip or set of chips, boards, or units In certain embodiments, some or all of the functionality described herein as being provided by a network node, base station, eNB or other such network device can be performed by processing circuitry 1470 executing instructions stored on device readable medium 1480 or memory within processing circuitry 1470. In alternative embodiments, some or all of the functionality can be provided by processing circuitry 1470 without executing instructions stored on a separate or discrete device readable medium, such as in a hard-wired manner In any of those embodiments, whether executing instructions stored on a device readable storage medium or not, processing circuitry 1470 can be configured to perform the described functionality. The benefits provided by such functionality are not limited to processing circuitry 1470 alone or to other components of network node 1460, but are enjoyed by network node 1460 as a whole, and/or by end users and the wireless network generally.

Device readable medium 1480 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1470. Device readable medium 1480 can store any suitable instructions, data or information, including a computer program, software, an application including one or more of logic, rules, code, tables, etc. and/or other instructions capable of being executed by processing circuitry 1470 and, utilized by network node 1460. Device readable medium 1480 can be used to store any calculations made by processing circuitry 1470 and/or any data received via interface 1490. In some embodiments, processing circuitry 1470 and device readable medium 1480 can be considered to be integrated.

Interface 1490 is used in the wired or wireless communication of signalling and/or data between network node 1460, network 1430, and/or WDs 1410. As illustrated, interface 1490 comprises port(s)/terminal(s) 1494 to send and receive data, for example to and from network 1430 over a wired connection. Interface 1490 also includes radio front end circuitry 1492 that can be coupled to, or in certain embodiments a part of, antenna 1462. Radio front end circuitry 1492 comprises filters 1498 and amplifiers 1496. Radio front end circuitry 1492 can be connected to antenna 1462 and processing circuitry 1470. Radio front end circuitry can be configured to condition signals communicated between antenna 1462 and processing circuitry 1470. Radio front end circuitry 1492 can receive digital data that is to be sent out to other network nodes or WDs via a wireless connection. Radio front end circuitry 1492 can convert the digital data into a radio signal having the appropriate channel and bandwidth parameters using a combination of filters 1498 and/or amplifiers 1496. The radio signal can then be transmitted via antenna 1462. Similarly, when receiving data, antenna 1462 can collect radio signals which are then converted into digital data by radio front end circuitry 1492. The digital data can be passed to processing circuitry 1470. In other embodiments, the interface can comprise different components and/or different combinations of components.

In certain alternative embodiments, network node 1460 may not include separate radio front end circuitry 1492, instead, processing circuitry 1470 can comprise radio front end circuitry and can be connected to antenna 1462 without separate radio front end circuitry 1492. Similarly, in some embodiments, all or some of RF transceiver circuitry 1472 can be considered a part of interface 1490. In still other embodiments, interface 1490 can include one or more ports or terminals 1494, radio front end circuitry 1492, and RF transceiver circuitry 1472, as part of a radio unit (not shown), and interface 1490 can communicate with baseband processing circuitry 1474, which is part of a digital unit (not shown).

Antenna 1462 can include one or more antennas, or antenna arrays, configured to send and/or receive wireless signals. Antenna 1462 can be coupled to radio front end circuitry 1490 and can be any type of antenna capable of transmitting and receiving data and/or signals wirelessly. In some embodiments, antenna 1462 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1462 can be separate from network node 1460 and can be connectable to network node 1460 through an interface or port.

Antenna 1462, interface 1490, and/or processing circuitry 1470 can be configured to perform any receiving operations and/or certain obtaining operations described herein as being performed by a network node. Any information, data and/or signals can be received from a wireless device, another network node and/or any other network equipment. Similarly, antenna 1462, interface 1490, and/or processing circuitry 1470 can be configured to perform any transmitting operations described herein as being performed by a network node. Any information, data and/or signals can be transmitted to a wireless device, another network node and/or any other network equipment.

Power circuitry 1487 can comprise, or be coupled to, power management circuitry and can be configured to supply the components of network node 1460 with power for performing the functionality described herein. Power circuitry 1487 can receive power from power source 1486. Power source 1486 and/or power circuitry 1487 can be configured to provide power to the various components of network node 1460 in a form suitable for the respective components (e.g., at a voltage and current level needed for each respective component). Power source 1486 can either be included in, or external to, power circuitry 1487 and/or network node 1460. For example, network node 1460 can be connectable to an external power source (e.g., an electricity outlet) via an input circuitry or interface such as an electrical cable, whereby the external power source supplies power to power circuitry 1487. As a further example, power source 1486 can comprise a source of power in the form of a battery or battery pack which is connected to, or integrated in, power circuitry 1487. The battery can provide backup power should the external power source fail. Other types of power sources, such as photovoltaic devices, can also be used.

Alternative embodiments of network node 1460 can include additional components beyond those shown in FIG. 14 that can be responsible for providing certain aspects of the network node's functionality, including any of the functionality described herein and/or any functionality necessary to support the subject matter described herein. For example, network node 1460 can include user interface equipment to allow and/or facilitate input of information into network node 1460 and to allow and/or facilitate output of information from network node 1460. This can allow and/or facilitate a user to perform diagnostic, maintenance, repair, and other administrative functions for network node 1460.

As used herein, wireless device (WD) refers to a device capable, configured, arranged and/or operable to communicate wirelessly with network nodes and/or other wireless devices. Unless otherwise noted, the term WD can be used interchangeably herein with user equipment (UE). Communicating wirelessly can involve transmitting and/or receiving wireless signals using electromagnetic waves, radio waves, infrared waves, and/or other types of signals suitable for conveying information through air. In some embodiments, a WD can be configured to transmit and/or receive information without direct human interaction. For instance, a WD can be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements, and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1410 includes antenna 1411, interface 1414, processing circuitry 1420, device readable medium 1430, user interface equipment 1432, auxiliary equipment 1434, power source 1436 and power circuitry 1437. WD 1410 can include multiple sets of one or more of the illustrated components for different wireless technologies supported by WD 1410, such as, for example, GSM, WCDMA, LTE, NR, WiFi, WiMAX, or Bluetooth wireless technologies, just to mention a few. These wireless technologies can be integrated into the same or different chips or set of chips as other components within WD 1410.

Antenna 1411 can include one or more antennas or antenna arrays, configured to send and/or receive wireless signals, and is connected to interface 1414. In certain alternative embodiments, antenna 1411 can be separate from WD 1410 and be connectable to WD 1410 through an interface or port. Antenna 1411, interface 1414, and/or processing circuitry 1420 can be configured to perform any receiving or transmitting operations described herein as being performed by a WD. Any information, data and/or signals can be received from a network node and/or another WD. In some embodiments, radio front end circuitry and/or antenna 1411 can be considered an interface.

As illustrated, interface 1414 comprises radio front end circuitry 1412 and antenna 1411. Radio front end circuitry 1412 comprise one or more filters 1418 and amplifiers 1416. Radio front end circuitry 1414 is connected to antenna 1411 and processing circuitry 1420, and can be configured to condition signals communicated between antenna 1411 and processing circuitry 1420. Radio front end circuitry 1412 can be coupled to or a part of antenna 1411. In some embodiments, WD 1410 may not include separate radio front end circuitry 1412; rather, processing circuitry 1420 can comprise radio front end circuitry and can be connected to antenna 1411. Similarly, in some embodiments, some or all of RF transceiver circuitry 1422 can be considered a part of interface 1414. Radio front end circuitry 1412 can receive digital data that is to be sent out to other network nodes or WDs via a wireless connection. Radio front end circuitry 1412 can convert the digital data into a radio signal having the appropriate channel and bandwidth parameters using a combination of filters 1418 and/or amplifiers 1416. The radio signal can then be transmitted via antenna 1411. Similarly, when receiving data, antenna 1411 can collect radio signals which are then converted into digital data by radio front end circuitry 1412. The digital data can be passed to processing circuitry 1420. In other embodiments, the interface can comprise different components and/or different combinations of components.

Processing circuitry 1420 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1410 components, such as device readable medium 1430, WD 1410 functionality. Such functionality can include providing any of the various wireless features or benefits discussed herein. For example, processing circuitry 1420 can execute instructions stored in device readable medium 1430 or in memory within processing circuitry 1420 to provide the functionality disclosed herein.

As illustrated, processing circuitry 1420 includes one or more of RF transceiver circuitry 1422, baseband processing circuitry 1424, and application processing circuitry 1426. In other embodiments, the processing circuitry can comprise different components and/or different combinations of components. In certain embodiments processing circuitry 1420 of WD 1410 can comprise a SOC. In some embodiments, RF transceiver circuitry 1422, baseband processing circuitry 1424, and application processing circuitry 1426 can be on separate chips or sets of chips. In alternative embodiments, part or all of baseband processing circuitry 1424 and application processing circuitry 1426 can be combined into one chip or set of chips, and RF transceiver circuitry 1422 can be on a separate chip or set of chips. In still alternative embodiments, part or all of RF transceiver circuitry 1422 and baseband processing circuitry 1424 can be on the same chip or set of chips, and application processing circuitry 1426 can be on a separate chip or set of chips. In yet other alternative embodiments, part or all of RF transceiver circuitry 1422, baseband processing circuitry 1424, and application processing circuitry 1426 can be combined in the same chip or set of chips. In some embodiments, RF transceiver circuitry 1422 can be a part of interface 1414. RF transceiver circuitry 1422 can condition RF signals for processing circuitry 1420.

In certain embodiments, some or all of the functionality described herein as being performed by a WD can be provided by processing circuitry 1420 executing instructions stored on device readable medium 1430, which in certain embodiments can be a computer-readable storage medium. In alternative embodiments, some or all of the functionality can be provided by processing circuitry 1420 without executing instructions stored on a separate or discrete device readable storage medium, such as in a hard-wired manner In any of those particular embodiments, whether executing instructions stored on a device readable storage medium or not, processing circuitry 1420 can be configured to perform the described functionality. The benefits provided by such functionality are not limited to processing circuitry 1420 alone or to other components of WD 1410, but are enjoyed by WD 1410 as a whole, and/or by end users and the wireless network generally.

Processing circuitry 1420 can be configured to perform any determining, calculating, or similar operations (e.g., certain obtaining operations) described herein as being performed by a WD. These operations, as performed by processing circuitry 1420, can include processing information obtained by processing circuitry 1420 by, for example, converting the obtained information into other information, comparing the obtained information or converted information to information stored by WD 1410, and/or performing one or more operations based on the obtained information or converted information, and as a result of said processing making a determination.

Device readable medium 1430 can be operable to store a computer program, software, an application including one or more of logic, rules, code, tables, etc. and/or other instructions capable of being executed by processing circuitry 1420. Device readable medium 1430 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1420. In some embodiments, processing circuitry 1420 and device readable medium 1430 can be considered to be integrated.

User interface equipment 1432 can include components that allow and/or facilitate a human user to interact with WD 1410. Such interaction can be of many forms, such as visual, audial, tactile, etc. User interface equipment 1432 can be operable to produce output to the user and to allow and/or facilitate the user to provide input to WD 1410. The type of interaction can vary depending on the type of user interface equipment 1432 installed in WD 1410. For example, if WD 1410 is a smart phone, the interaction can be via a touch screen; if WD 1410 is a smart meter, the interaction can be through a screen that provides usage (e.g., the number of gallons used) or a speaker that provides an audible alert (e.g., if smoke is detected). User interface equipment 1432 can include input interfaces, devices and circuits, and output interfaces, devices and circuits. User interface equipment 1432 can be configured to allow and/or facilitate input of information into WD 1410, and is connected to processing circuitry 1420 to allow and/or facilitate processing circuitry 1420 to process the input information. User interface equipment 1432 can include, for example, a microphone, a proximity or other sensor, keys/buttons, a touch display, one or more cameras, a USB port, or other input circuitry. User interface equipment 1432 is also configured to allow and/or facilitate output of information from WD 1410, and to allow and/or facilitate processing circuitry 1420 to output information from WD 1410. User interface equipment 1432 can include, for example, a speaker, a display, vibrating circuitry, a USB port, a headphone interface, or other output circuitry. Using one or more input and output interfaces, devices, and circuits, of user interface equipment 1432, WD 1410 can communicate with end users and/or the wireless network, and allow and/or facilitate them to benefit from the functionality described herein.

Auxiliary equipment 1434 is operable to provide more specific functionality which may not be generally performed by WDs. This can comprise specialized sensors for doing measurements for various purposes, interfaces for additional types of communication such as wired communications etc. The inclusion and type of components of auxiliary equipment 1434 can vary depending on the embodiment and/or scenario.

Power source 1436 can, in some embodiments, be in the form of a battery or battery pack. Other types of power sources, such as an external power source (e.g., an electricity outlet), photovoltaic devices or power cells, can also be used. WD 1410 can further comprise power circuitry 1437 for delivering power from power source 1436 to the various parts of WD 1410 which need power from power source 1436 to carry out any functionality described or indicated herein. Power circuitry 1437 can in certain embodiments comprise power management circuitry. Power circuitry 1437 can additionally or alternatively be operable to receive power from an external power source; in which case WD 1410 can be connectable to the external power source (such as an electricity outlet) via input circuitry or an interface such as an electrical power cable. Power circuitry 1437 can also in certain embodiments be operable to deliver power from an external power source to power source 1436. This can be, for example, for the charging of power source 1436. Power circuitry 1437 can perform any converting or other modification to the power from power source 1436 to make it suitable for supply to the respective components of WD 1410.

Figure 15:
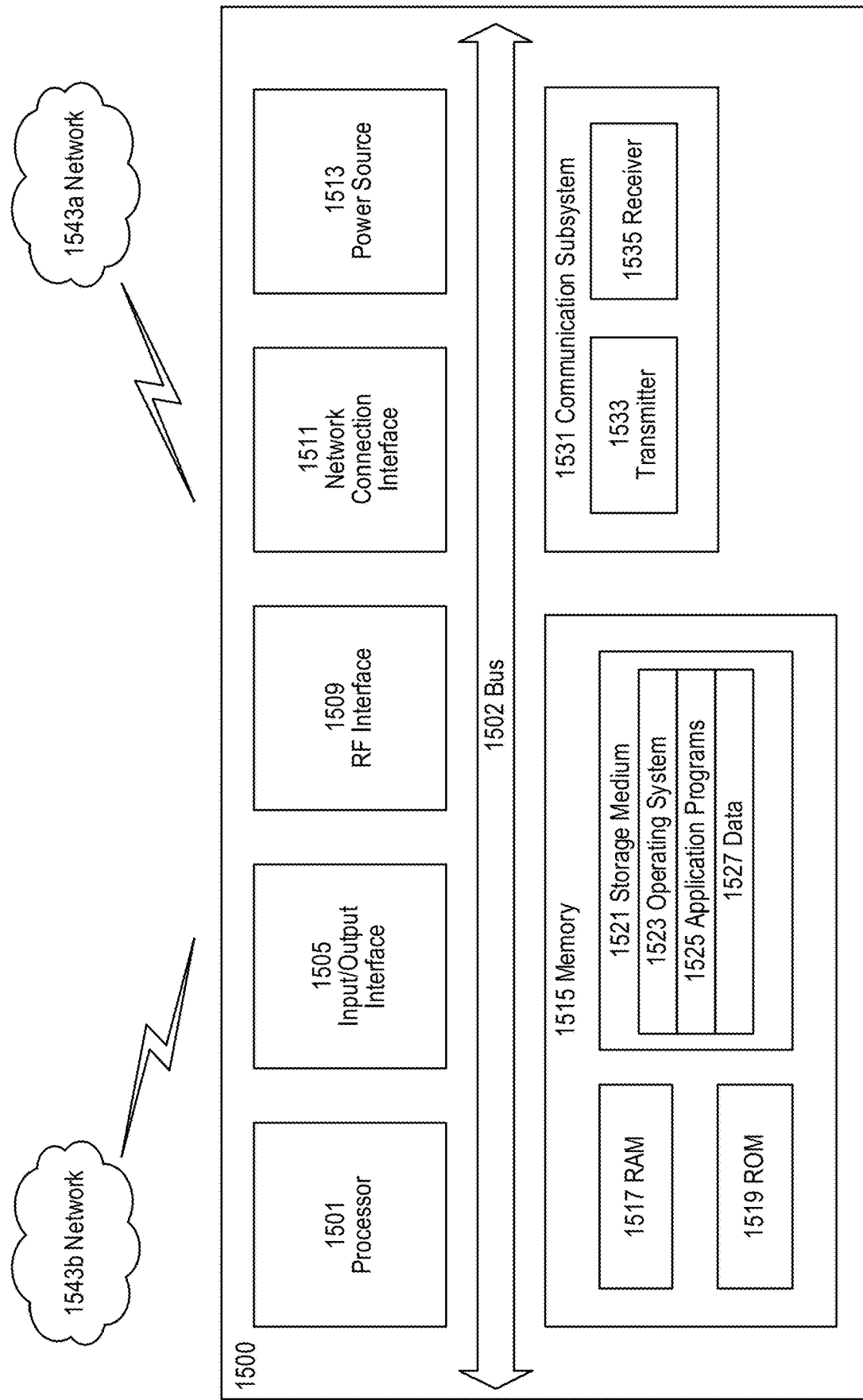
FIG. 15 is a block diagram of an exemplary user equipment (UE) configurable according to various exemplary embodiments of the present disclosure.

FIG. 15 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 15200 can be any UE identified by the 3$^{rd}$ Generation Partnership Project (3GPP), including a NB-IoT UE, a machine type communication (MTC) UE, and/or an enhanced MTC (eMTC) UE. UE 1500, as illustrated in FIG. 15, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE can be used interchangeable. Accordingly, although FIG. 15 is a UE, the components discussed herein are equally applicable to a WD, and vice-versa.

In FIG. 15, UE 1500 includes processing circuitry 1501 that is operatively coupled to input/output interface 1505, radio frequency (RF) interface 1509, network connection interface 1511, memory 1515 including random access memory (RAM) 1517, read-only memory (ROM) 1519, and storage medium 1521 or the like, communication subsystem 1531, power source 1533, and/or any other component, or any combination thereof. Storage medium 1521 includes operating system 1523, application program 1525, and data 1527. In other embodiments, storage medium 1521 can include other similar types of information. Certain UEs can utilize all of the components shown in FIG. 15, or only a subset of the components. The level of integration between the components can vary from one UE to another UE. Further, certain UEs can contain multiple instances of a component, such as multiple processors, memories, transceivers, transmitters, receivers, etc.

In FIG. 15, processing circuitry 1501 can be configured to process computer instructions and data. Processing circuitry 1501 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1501 can include two central processing units (CPUs). Data can be information in a form suitable for use by a computer.

In the depicted embodiment, input/output interface 1505 can be configured to provide a communication interface to an input device, output device, or input and output device. UE 1500 can be configured to use an output device via input/output interface 1505. An output device can use the same type of interface port as an input device. For example, a USB port can be used to provide input to and output from UE 1500. The output device can be a speaker, a sound card, a video card, a display, a monitor, a printer, an actuator, an emitter, a smartcard, another output device, or any combination thereof. UE 1500 can be configured to use an input device via input/output interface 1505 to allow and/or facilitate a user to capture information into UE 1500. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 15, RF interface 1509 can be configured to provide a communication interface to RF components such as a transmitter, a receiver, and an antenna. Network connection interface 1511 can be configured to provide a communication interface to network 1543a. Network 1543a can encompass wired and/or wireless networks such as a local-area network (LAN), a wide-area network (WAN), a computer network, a wireless network, a telecommunications network, another like network or any combination thereof. For example, network 1543a can comprise a Wi-Fi network. Network connection interface 1511 can be configured to include a receiver and a transmitter interface used to communicate with one or more other devices over a communication network according to one or more communication protocols, such as Ethernet, TCP/IP, SONET, ATM, or the like. Network connection interface 1511 can implement receiver and transmitter functionality appropriate to the communication network links (e.g., optical, electrical, and the like). The transmitter and receiver functions can share circuit components, software or firmware, or alternatively can be implemented separately.

RAM 1517 can be configured to interface via bus 1510 to processing circuitry 1501 to provide storage or caching of data or computer instructions during the execution of software programs such as the operating system, application programs, and device drivers. ROM 1519 can be configured to provide computer instructions or data to processing circuitry 1501. For example, ROM 1519 can be configured to store invariant low-level system code or data for basic system functions such as basic input and output (I/O), startup, or reception of keystrokes from a keyboard that are stored in a non-volatile memory. Storage medium 1521 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1521 can be configured to include operating system 1523, application program 1525 such as a web browser application, a widget or gadget engine or another application, and data file 1527. Storage medium 1521 can store, for use by UE 1500, any of a variety of various operating systems or combinations of operating systems.

Storage medium 1521 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1521 can allow and/or facilitate UE 1500 to access computer-executable instructions, application programs or the like, stored on transitory or non-transitory memory media, to off-load data, or to upload data. An article of manufacture, such as one utilizing a communication system can be tangibly embodied in storage medium 1521, which can comprise a device readable medium.

In FIG. 15, processing circuitry 1501 can be configured to communicate with network 1543*b* using communication subsystem 1531. Network 1543*a* and network 1543*b* can be the same network or networks or different network or networks. Communication subsystem 1531 can be configured to include one or more transceivers used to communicate with network 1543*b*. For example, communication subsystem 1531 can be configured to include one or more transceivers used to communicate with one or more remote transceivers of another device capable of wireless communication such as another WD, UE, or base station of a radio access network (RAN) according to one or more communication protocols, such as IEEE 810.15, CDMA, WCDMA, GSM, LTE, UTRAN, WiMax, or the like. Each transceiver can include transmitter 1533 and/or receiver 1535 to implement transmitter or receiver functionality, respectively, appropriate to the RAN links (e.g., frequency allocations and the like). Further, transmitter 1533 and receiver 1535 of each transceiver can share circuit components, software or firmware, or alternatively can be implemented separately.

In the illustrated embodiment, the communication functions of communication subsystem 1531 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1531 can include cellular communication, Wi-Fi communication, Bluetooth communication, and GPS communication. Network 1543*b* can encompass wired and/or wireless networks such as a local-area network (LAN), a wide-area network (WAN), a computer network, a wireless network, a telecommunications network, another like network or any combination thereof. For example, network 1543*b* can be a cellular network, a Wi-Fi network, and/or a near-field network. Power source 1513 can be configured to provide alternating current (AC) or direct current (DC) power to components of UE 1500. As another example, one of networks 1543*a-b* can be an LTE RAN and the other of networks 1543*a-b* can be an NR RAN.

The features, benefits and/or functions described herein can be implemented in one of the components of UE 1500 or partitioned across multiple components of UE 1500. Further, the features, benefits, and/or functions described herein can be implemented in any combination of hardware, software or firmware. In one example, communication subsystem 1531 can be configured to include any of the components described herein. Further, processing circuitry 1501 can be configured to communicate with any of such components over bus 1510. In another example, any of such components can be represented by program instructions stored in memory that when executed by processing circuitry 1501 perform the corresponding functions described herein. In another example, the functionality of any of such components can be partitioned between processing circuitry 1501 and communication subsystem 1531. In another example, the non-computationally intensive functions of any of such components can be implemented in software or firmware and the computationally intensive functions can be implemented in hardware.

Figure 16:
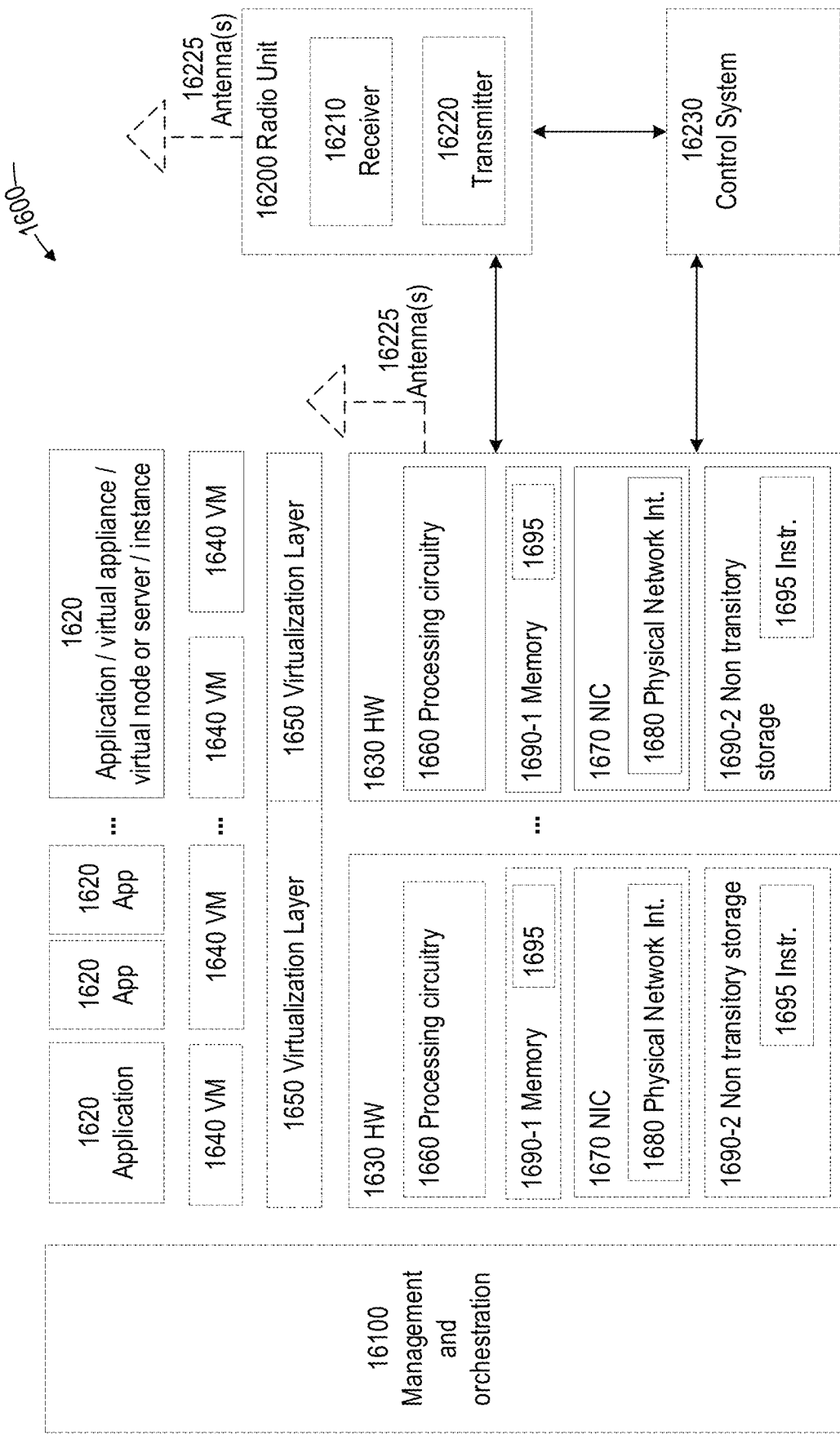
FIG. 16 is a block diagram of illustrating a virtualization environment that can facilitate virtualization of various functions implemented according to various exemplary embodiments of the present disclosure.

FIG. 16 is a schematic block diagram illustrating a virtualization environment 1600 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1600 hosted by one or more of hardware nodes 1630. Further, in embodiments in which the virtual node is not a radio access node or does not require radio connectivity (e.g., a core network node), then the network node can be entirely virtualized.

The functions can be implemented by one or more applications 1620 (which can alternatively be called software instances, virtual appliances, network functions, virtual nodes, virtual network functions, etc.) operative to implement some of the features, functions, and/or benefits of some of the embodiments disclosed herein. Applications 1620 are run in virtualization environment 1600 which provides hardware 1630 comprising processing circuitry 1660 and memory 1690. Memory 1690 contains instructions 1695 executable by processing circuitry 1660 whereby application 1620 is operative to provide one or more of the features, benefits, and/or functions disclosed herein.

Virtualization environment 1600, comprises general-purpose or special-purpose network hardware devices 1630 comprising a set of one or more processors or processing circuitry 1660, which can be commercial off-the-shelf (COTS) processors, dedicated Application Specific Integrated Circuits (ASICs), or any other type of processing circuitry including digital or analog hardware components or special purpose processors. Each hardware device can comprise memory 1690-1 which can be non-persistent memory for temporarily storing instructions 1695 or software executed by processing circuitry 1660. Each hardware device can comprise one or more network interface controllers (NICs) 1670, also known as network interface cards, which include physical network interface 1680. Each hardware device can also include non-transitory, persistent, machine-readable storage media 1690-2 having stored therein software 1695 and/or instructions executable by processing circuitry 1660. Software 1695 can include any type of software including software for instantiating one or more virtualization layers 1650 (also referred to as hypervisors), software to execute virtual machines 1640 as well as software allowing it to execute functions, features and/or benefits described in relation with some embodiments described herein.

Virtual machines 1640, comprise virtual processing, virtual memory, virtual networking or interface and virtual storage, and can be run by a corresponding virtualization layer 1650 or hypervisor. Different embodiments of the instance of virtual appliance 1620 can be implemented on one or more of virtual machines 1640, and the implementations can be made in different ways.

During operation, processing circuitry 1660 executes software 1695 to instantiate the hypervisor or virtualization layer 1650, which can sometimes be referred to as a virtual machine monitor (VMM). Virtualization layer 1650 can present a virtual operating platform that appears like networking hardware to virtual machine 1640.

As shown in FIG. 16, hardware 1630 can be a standalone network node with generic or specific components. Hardware 1630 can comprise antenna 16225 and can implement some functions via virtualization. Alternatively, hardware 1630 can be part of a larger cluster of hardware (e.g. such as in a data center or customer premise equipment (CPE)) where many hardware nodes work together and are managed via management and orchestration (MANO) 16100, which, among others, oversees lifecycle management of applications 1620.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 1640 can be a software implementation of a physical machine that runs programs as if they were executing on a physical, non-virtualized machine. Each of virtual machines 1640, and that part of hardware 1630 that executes that virtual machine, be it hardware dedicated to that virtual machine and/or hardware shared by that virtual machine with others of the virtual machines 1640, forms a separate virtual network elements (VNE).

Still in the context of NFV, Virtual Network Function (VNF) is responsible for handling specific network functions that run in one or more virtual machines 1640 on top of hardware networking infrastructure 1630 and corresponds to application 1620 in FIG. 16.

In some embodiments, one or more radio units 16200 that each include one or more transmitters 16220 and one or more receivers 16210 can be coupled to one or more antennas 16225. Radio units 16200 can communicate directly with hardware nodes 1630 via one or more appropriate network interfaces and can be used in combination with the virtual components to provide a virtual node with radio capabilities, such as a radio access node or a base station.

In some embodiments, some signalling can be effected with the use of control system 16230 which can alternatively be used for communication between the hardware nodes 1630 and radio units 16200.

Figure 17:
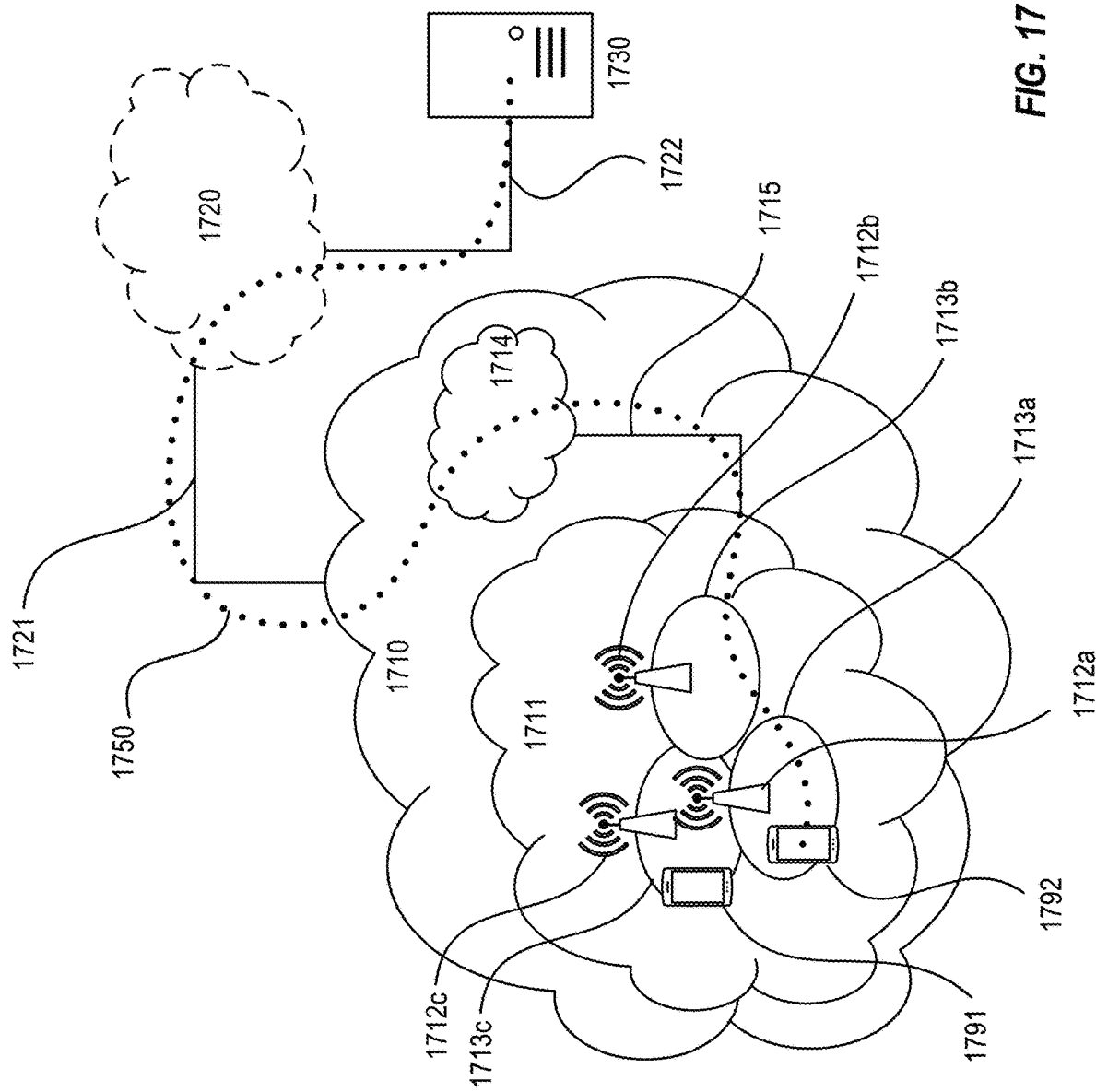
FIGS. 17-18 are block diagrams of exemplary communication systems configurable according to various exemplary embodiments of the present disclosure.

With reference to FIG. 17, in accordance with an embodiment, a communication system includes telecommunication network 1710, such as a 3GPP-type cellular network, which comprises access network 1711, such as a radio access network, and core network 1714. Access network 1711 comprises a plurality of base stations 1712a, 1712b, 1712c, such as NBs, eNBs, gNBs or other types of wireless access points, each defining a corresponding coverage area 1713a, 1713b, 1713c. Each base station 1712a, 1712b, 1712c is connectable to core network 1714 over a wired or wireless connection 1715. A first UE 1791 located in coverage area 1713c can be configured to wirelessly connect to, or be paged by, the corresponding base station 1712c. A second UE 1792 in coverage area 1713a is wirelessly connectable to the corresponding base station 1712a. While a plurality of UEs 1791, 1792 are illustrated in this example, the disclosed embodiments are equally applicable to a situation where a sole UE is in the coverage area or where a sole UE is connecting to the corresponding base station 1712.

Telecommunication network 1710 is itself connected to host computer 1730, which can be embodied in the hardware and/or software of a standalone server, a cloud-implemented server, a distributed server or as processing resources in a server farm. Host computer 1730 can be under the ownership or control of a service provider, or can be operated by the service provider or on behalf of the service provider. Connections 1721 and 1722 between telecommunication network 1710 and host computer 1730 can extend directly from core network 1714 to host computer 1730 or can go via an optional intermediate network 1720. Intermediate network 1720 can be one of, or a combination of more than one of, a public, private or hosted network; intermediate network 1720, if any, can be a backbone network or the Internet; in particular, intermediate network 1720 can comprise two or more sub-networks (not shown).

The communication system of FIG. 17 as a whole enables connectivity between the connected UEs 1791, 1792 and host computer 1730. The connectivity can be described as an over-the-top (OTT) connection 1750. Host computer 1730 and the connected UEs 1791, 1792 are configured to communicate data and/or signaling via OTT connection 1750, using access network 1711, core network 1714, any intermediate network 1720 and possible further infrastructure (not shown) as intermediaries. OTT connection 1750 can be transparent in the sense that the participating communication devices through which OTT connection 1750 passes are unaware of routing of uplink and downlink communications. For example, base station 1712 may not or need not be informed about the past routing of an incoming downlink communication with data originating from host computer 1730 to be forwarded (e.g., handed over) to a connected UE 1791. Similarly, base station 1712 need not be aware of the future routing of an outgoing uplink communication originating from the UE 1791 towards the host computer 1730.

Example implementations, in accordance with an embodiment, of the UE, base station and host computer discussed in the preceding paragraphs will now be described with reference to FIG. 18. In communication system 1800, host computer 1810 comprises hardware 1815 including communication interface 1816 configured to set up and maintain a wired or wireless connection with an interface of a different communication device of communication system 1800. Host computer 1810 further comprises processing circuitry 1818, which can have storage and/or processing capabilities. In particular, processing circuitry 1818 can comprise one or more programmable processors, application-specific integrated circuits, field programmable gate arrays or combinations of these (not shown) adapted to execute instructions. Host computer 1810 further comprises software 1811, which is stored in or accessible by host computer 1810 and executable by processing circuitry 1818. Software 1811 includes host application 1812. Host application 1812 can be operable to provide a service to a remote user, such as UE 1830 connecting via OTT connection 1850 terminating at UE 1830 and host computer 1810. In providing the service to the remote user, host application 1812 can provide user data which is transmitted using OTT connection 1850.

Communication system 1800 can also include base station 1820 provided in a telecommunication system and comprising hardware 1825 enabling it to communicate with host computer 1810 and with UE 1830. Hardware 1825 can include communication interface 1826 for setting up and maintaining a wired or wireless connection with an interface of a different communication device of communication system 1800, as well as radio interface 1827 for setting up and maintaining at least wireless connection 1870 with UE 1830 located in a coverage area (not shown in FIG. 18) served by base station 1820. Communication interface 1826 can be configured to facilitate connection 1860 to host computer 1810. Connection 1860 can be direct or it can pass through a core network (not shown in FIG. 18) of the telecommunication system and/or through one or more intermediate networks outside the telecommunication system. In the embodiment shown, hardware 1825 of base station 1820 can also include processing circuitry 1828, which can comprise one or more programmable processors, application-specific integrated circuits, field programmable gate arrays or combinations of these (not shown) adapted to execute instructions. Base station 1820 further has software 1821 stored internally or accessible via an external connection.

Communication system 1800 can also include UE 1830 already referred to. Its hardware 1835 can include radio interface 1837 configured to set up and maintain wireless connection 1870 with a base station serving a coverage area in which UE 1830 is currently located. Hardware 1835 of UE 1830 can also include processing circuitry 1838, which can comprise one or more programmable processors, application-specific integrated circuits, field programmable gate arrays or combinations of these (not shown) adapted to execute instructions. UE 1830 further comprises software 1831, which is stored in or accessible by UE 1830 and executable by processing circuitry 1838. Software 1831 includes client application 1832. Client application 1832 can be operable to provide a service to a human or non-human user via UE 1830, with the support of host computer 1810. In host computer 1810, an executing host application 1812 can communicate with the executing client application 1832 via OTT connection 1850 terminating at UE 1830 and host computer 1810. In providing the service to the user, client application 1832 can receive request data from host application 1812 and provide user data in response to the request data. OTT connection 1850 can transfer both the request data and the user data. Client application 1832 can interact with the user to generate the user data that it provides.

Figure 18:
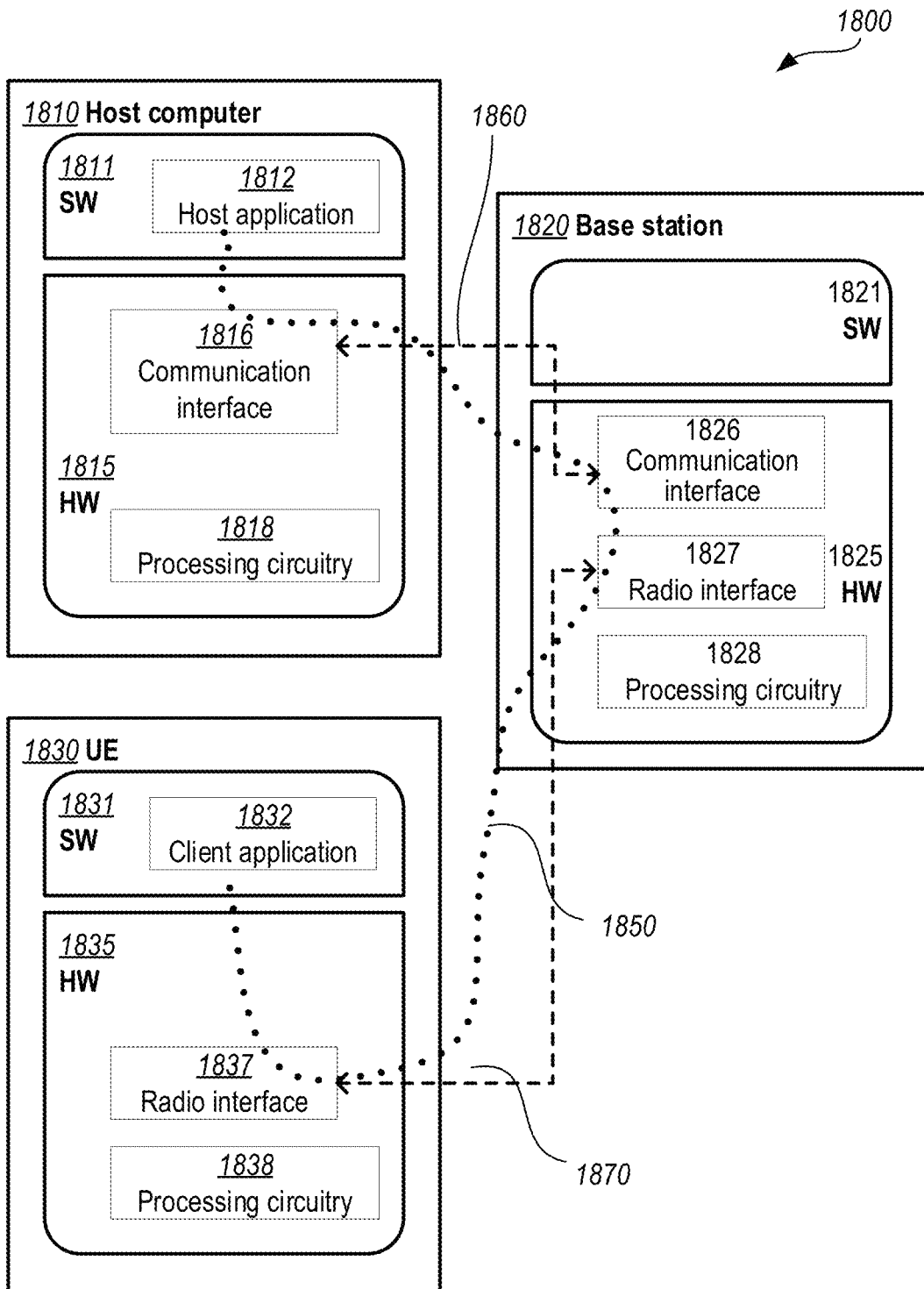

It is noted that host computer 1810, base station 1820 and UE 1830 illustrated in FIG. 18 can be similar or identical to host computer 1730, one of base stations 1712a, 1712b, 1712c and one of UEs 1791, 1792 of FIG. 17, respectively. This is to say, the inner workings of these entities can be as shown in FIG. 18 and independently, the surrounding network topology can be that of FIG. 17.

In FIG. 18, OTT connection 1850 has been drawn abstractly to illustrate the communication between host computer 1810 and UE 1830 via base station 1820, without explicit reference to any intermediary devices and the precise routing of messages via these devices. Network infrastructure can determine the routing, which it can be configured to hide from UE 1830 or from the service provider operating host computer 1810, or both. While OTT connection 1850 is active, the network infrastructure can further take decisions by which it dynamically changes the routing (e.g., on the basis of load balancing consideration or reconfiguration of the network).

Wireless connection 1870 between UE 1830 and base station 1820 is in accordance with the teachings of the embodiments described throughout this disclosure. One or more of the various embodiments improve the performance of OTT services provided to UE 1830 using OTT connection 1850, in which wireless connection 1870 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 1850 between host computer 1810 and UE 1830, in response to variations in the measurement results. The measurement procedure and/or the network functionality for reconfiguring OTT connection 1850 can be implemented in software 1811 and hardware 1815 of host computer 1810 or in software 1831 and hardware 1835 of UE 1830, or both. In embodiments, sensors (not shown) can be deployed in or in association with communication devices through which OTT connection 1850 passes; the sensors can participate in the measurement procedure by supplying values of the monitored quantities exemplified above, or supplying values of other physical quantities from which software 1811, 1831 can compute or estimate the monitored quantities. The reconfiguring of OTT connection 1850 can include message format, retransmission settings, preferred routing etc.; the reconfiguring need not affect base station 1820, and it can be unknown or imperceptible to base station 1820. Such procedures and functionalities can be known and practiced in the art. In certain embodiments, measurements can involve proprietary UE signaling facilitating host computer 1810's measurements of throughput, propagation times, latency and the like. The measurements can be implemented in that software 1811 and 1831 causes messages to be transmitted, in particular empty or 'dummy' messages, using OTT connection 1850 while it monitors propagation times, errors etc.

FIG. 19 is a flowchart illustrating an exemplary method and/or procedure implemented in a communication system, in accordance with one embodiment. The communication system includes a host computer, a base station and a UE which, in some exemplary embodiments, can be those described with reference to FIGS. 17 and 18. For simplicity of the present disclosure, only drawing references to FIG. 19 will be included in this section. In step 1910, the host computer provides user data. In substep 1911 (which can be optional) of step 1910, the host computer provides the user data by executing a host application. In step 1920, the host computer initiates a transmission carrying the user data to the UE. In step 1930 (which can be optional), the base station transmits to the UE the user data which was carried in the transmission that the host computer initiated, in accordance with the teachings of the embodiments described throughout this disclosure. In step 1940 (which can also be optional), the UE executes a client application associated with the host application executed by the host computer.

FIG. 20 is a flowchart illustrating an exemplary method and/or procedure implemented in a communication system, in accordance with one embodiment. The communication system includes a host computer, a base station and a UE which can be those described with reference to FIGS. 17 and 18. For simplicity of the present disclosure, only drawing references to FIG. 20 will be included in this section. In step 2010 of the method, the host computer provides user data. In an optional substep (not shown) the host computer provides the user data by executing a host application. In step 2100, the host computer initiates a transmission carrying the user data to the UE. The transmission can pass via the base station, in accordance with the teachings of the embodiments described throughout this disclosure. In step 2030 (which can be optional), the UE receives the user data carried in the transmission.

Figures 21, 22:
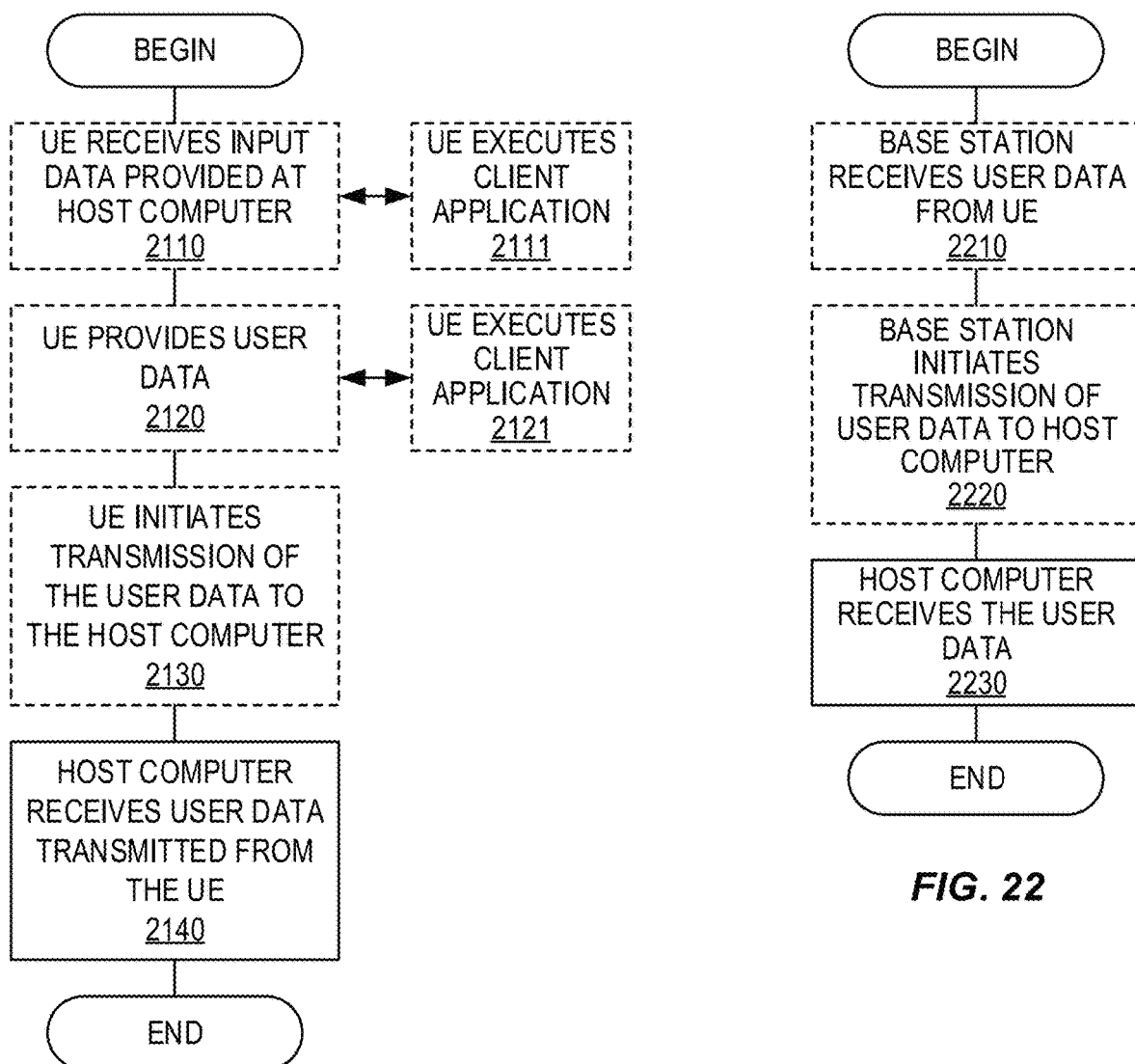

FIG. 21 is a flowchart illustrating an exemplary method and/or procedure implemented in a communication system, in accordance with one embodiment. The communication system includes a host computer, a base station and a UE which can be those described with reference to FIGS. 17 and 18. For simplicity of the present disclosure, only drawing references to FIG. 21 will be included in this section. In step 2110 (which can be optional), the UE receives input data provided by the host computer. Additionally or alternatively, in step 2120, the UE provides user data. In substep 2121 (which can be optional) of step 2120, the UE provides the user data by executing a client application. In substep 2111 (which can be optional) of step 2110, the UE executes a client application which provides the user data in reaction to the received input data provided by the host computer. In providing the user data, the executed client application can further consider user input received from the user. Regardless of the specific manner in which the user data was provided, the UE initiates, in substep 2130 (which can be optional), transmission of the user data to the host computer. In step 2140 of the method, the host computer receives the user data transmitted from the UE, in accordance with the teachings of the embodiments described throughout this disclosure.

FIG. 22 is a flowchart illustrating an exemplary method and/or procedure implemented in a communication system, in accordance with one embodiment. The communication system includes a host computer, a base station and a UE which can be those described with reference to FIGS. 17 and 18. For simplicity of the present disclosure, only drawing references to FIG. 22 will be included in this section. In step 2210 (which can be optional), in accordance with the teachings of the embodiments described throughout this disclosure, the base station receives user data from the UE. In step 2220 (which can be optional), the base station initiates transmission of the received user data to the host computer. In step 2230 (which can be optional), the host computer receives the user data carried in the transmission initiated by the base station.

The term unit can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Exemplary embodiments of the present disclosure include the following enumerated examples:

1. A method performed by a first network node in a first radio access network (RAN), the first network node in communication with a second network node in a second RAN, the method comprising:

determining one or more group identifiers associated with at least one of:

i. a user equipment (UE) served by the first network node; and ii. a subscriber associated with the UE;

sending a request for the second network node to establish dual connectivity, as a secondary node (SN), with the UE, wherein the request comprises information relating to the one or more group identifiers; and managing the UE's access to resources of the first RAN based on the one or more group identifiers.

2. The method of embodiment 1, wherein the information relating to the one or more group identifiers is usable by the second network node to manage the UE's access to resources of the second RAN.

3. The method of any of embodiments 1-2, wherein:
   The first network node is an eNB in an LTE RAN; and
   The second network node is a gNB in an NR RAN.

4. The method of any of embodiments 1-3, wherein the one or more group identifiers comprise at least one of a Subscriber Profile ID for RAT/Frequency Priority (SPID) and a Dedicated Core Network ID (DCN-id).

5. The method of any of embodiments 1-4, wherein the information relating to the SPID comprises a RAT/Frequency Selection Priority (RFSP).

6. The method of any of embodiments 1-3, wherein the information relating to the DCN-id comprises an index value that maps to one or more policies for managing UE access to resources of the second RAN.

7. The method of any of embodiments 1-3, wherein each of the one or more group identifiers is determined based on one or more of Subscribers Profile ID for RAT/Frequency Priority (SPID), Dedicated Core Network ID (DCN-id), Public Land Mobile Network ID (PLMN-id), QoS Class Indicator (QCI), and Closed Subscriber Group (CSG) membership.

8. The method of any of embodiments 1-7, wherein managing the UE's access to resources of the first RAN is further based on a profile of the subscriber associated with the UE.

9. A method performed by a second network node in a second radio access network (RAN), the second network node in communication with a first network node in a first RAN, the method comprising:

receiving a request from the first network node to establish dual connectivity, as a secondary node (SN), with a user equipment (UE) served by the first network node, wherein the request comprises information relating to one or more group identifiers that are associated with at least one of:

i. the UE; and ii. a subscriber associated with the UE;

managing the UE's access to resources of the second RAN based on the one or more group identifiers.

10. The method of embodiment 9, wherein request is received by central unit (CU) comprising the second network node, and the method further comprises sending the information relating to the one or more group identifiers to at least one distributed unit (DU) comprising the second network node.

11. The method of any of embodiments 9-10, wherein:
    The first network node is an eNB in an LTE RAN; and
    The second network node is a gNB in an NR RAN.

12. The method of any of embodiments 9-11, wherein the one or more group identifiers comprise at least one of a Subscriber Profile ID for RAT/Frequency Priority (SPID) and a Dedicated Core Network ID (DCN-id).

13. The method of any of embodiments 9-12, wherein the information relating to the SPID comprises a RAT/Frequency Selection Priority (RFSP).

14. The method of any of embodiments 9-12, wherein the information relating to the DCN-id comprises an index value that maps to one or more policies for managing UE access to resources of the second RAN.

15. The method of any of embodiments 9-11, wherein each of the one or more group identifiers is determined based on one or more of Subscribers Profile ID for RAT/Frequency Priority (SPID), Dedicated Core Network ID (DCN-id), Public Land Mobile Network ID (PLMN-id), QoS Class Indicator (QCI), and Closed Subscriber Group (CSG) membership.

16. The method of any of embodiments 9-15, wherein managing the UE's access to resources of the second RAN is further based on a profile of the subscriber associated with the UE.

17. The method of any of embodiments 9-15, wherein managing the UE's access to resources of the second RAN is based on a policy that prioritizes access by UEs associated with the one or more group identifiers over access by UEs that are not associated with all of the one or more identifiers.

18. The method of embodiment 17, wherein the policy prioritizes access by UEs associated with the one or more group identifiers to particular bandwidth part (BWP) frequency resources that are allocated by the second RAN.

19. The method of any of embodiments 9-15, wherein managing the UE's access to resources of the second RAN comprises guaranteeing that UEs associated with the one or more group identifiers can access at least a predefined proportion of resources available in the second RAN.

20. A first network node in a first radio access network (RAN), the first network node in communication with a second network node in a second RAN, the first network node comprising:
    processing circuitry configured to perform operations corresponding to any of the methods of embodiments 1-8; and
    power supply circuitry configured to supply power to the first network node.

21. A second network node in a second radio access network (RAN), the second network node in communication with a first network node in a first RAN, the second network node comprising:
    processing circuitry configured to perform operations corresponding to any of the methods of embodiments 9-19; and
    power supply circuitry configured to supply power to the second network node.

22. A communication system including a host computer comprising:
    processing circuitry configured to provide user data; and
    a communication interface configured to forward the user data to a cellular network for transmission to a user equipment (UE),
    wherein the cellular network comprises a first radio access network (RAN) comprising a first network node and a second RAN comprising a second network node, each of the first and second network nodes having a radio interface and processing circuitry;
    the first network node's processing circuitry is configured to perform operations corresponding to any of the methods of embodiments 1-8; and
    the second network node's processing circuitry is configured to perform operations corresponding to any of the methods of embodiments 9-19.

23. The communication system of embodiment 22, further including a user equipment configured to communicate with at least one of the first and second DUs.

24. The communication system of any of embodiments 22-23, wherein:
    the processing circuitry of the host computer is configured to execute a host application, thereby providing the user data; and
    the UE comprises processing circuitry configured to execute a client application associated with the host application.

25. A method implemented in a communication system including a host computer, first and second network nodes, and a user equipment (UE), the method comprising:
    at the host computer, providing user data;
    at the host computer, initiating a transmission carrying the user data to the UE via a cellular network comprising the first and second network nodes; and
    operations, performed by the first network node, corresponding to any of the methods of embodiments 1-8; and
    operations, performed by the second network node, corresponding to any of the methods of embodiments 9-19.

26. The method of embodiment 25, further comprising, transmitting the user data by at least one of the first and second network nodes.

27. The method of any of embodiments 25-26, wherein the user data is provided at the host computer by executing a host application, the method further comprising, at the UE, executing a client application associated with the host application.

28. A communication system including a host computer comprising a communication interface configured to receive user data originating from a transmission from a user equipment (UE) to at least one of a first network node comprising a first radio access network (RAN) and a second network node comprising a second RAN, wherein the second network node comprises a radio interface and processing circuitry configured to perform operations corresponding to any of the methods of embodiments 9-19, and wherein the first network node comprises processing circuitry configured to perform operations corresponding to any of the methods of embodiments 1-8.

29. The communication system of the previous embodiment further including the first and second network nodes.

30. The communication system of any of embodiments 28-29, further including the UE, wherein the UE is configured to communicate with at least one of the first and second network nodes.

31. The communication system of any of embodiments 28-30, wherein:
    the processing circuitry of the host computer is configured to execute a host application;

the UE is configured to execute a client application associated with the host application, thereby providing the user data to be received by the host computer.

The invention claimed is:

1. A method performed by an evolved Node B (eNB) configured with a Long-Term Evolution (LTE) radio access technology (RAT), the method comprising:
 managing access to resources of the LTE RAT by a user equipment (UE) served by the eNB, based on one or more radio resource management (RRM) policies for the LTE RAT; and
 sending, to a next-generation Node B (gNB) configured with a New Radio (NR) RAT, a request to establish dual connectivity with the UE as a secondary node (SN), wherein the request includes a Subscribers Profile ID for RAT/Frequency Priority (SPID) that is associated with the one or more RRM policies.

2. The method of claim 1, wherein the SPID is also associated with one or more further RRM policies for the NR RAT.

3. The method of claim 2, wherein the one or more further RRM policies for the NR RAT are the same as the one or more RRM policies for the LTE RAT.

4. The method of claim 1, further comprising receiving the SPID from an Evolved Packet Core (EPC) network.

5. The method of claim 1, wherein the SPID relates to one or more of the following: the UE, a subscriber associated with the UE, and a group of UEs that includes the UE.

6. The method of claim 1, wherein managing access to resources of the LTE RAT by the UE comprises:
 mapping the SPID to a particular network slice associated with the LTE RAT; and
 scheduling resources of the LTE RAT for UE transmission or reception of data, based on the following associated with the particular network slice:
  one or more scheduling parameters, and
  a predefined share of the resources of the LTE RAT.

7. A method performed a next-generation Node B (gNB) configured with a New Radio (NR) radio access technology (RAT), the method comprising:
 receiving, from an evolved Node B (eNB) configured with a Long-Term Evolution (LTE) RAT, a request to establish dual connectivity, as a secondary node (SN), with a user equipment (UE) served by the eNB, wherein the request comprises a Subscribers Profile ID for RAT/Frequency Priority (SPID);
 mapping the SPID to one or more radio resource management (RRM) policies for the NR RAT; and
 managing access to resources of the NR RAT by the UE, based on the one or more RRM policies for the NR RAT.

8. The method of claim 7, wherein the SPID is also associated with one or more further RRM policies for the LTE RAT.

9. The method of claim 8, wherein the one or more further RRM policies for the LTE RAT are the same as the one or more RRM policies for the NR RAT.

10. The method of claim 7, wherein the SPID relates to one or more of the following: the UE, a subscriber associated with the UE, and a group of UEs that includes the UE.

11. The method of claim 7, wherein:
 the SPID is one of a first group of one or more SPIDs; and
 the one or more RRM policies include one or more of the following:
  a first policy that prioritizes access by the UE to the resources of the NR RAT over access by UEs that are not associated with any SPIDs of the first group; and
  a second policy that guarantees access by the UEs associated with the first group of SPIDs to at least a predefined share of the resources of the NR RAT.

12. An evolved Node B (eNB) configured with a Long-Term Evolution (LTE) radio access technology (RAT), the eNB comprising:
 communication interface circuitry configured to communicate with a next-generation Node B (gNB) configured with a New Radio (NR) RAT; and
 processing circuitry operably coupled to the communication circuitry, whereby the processing circuitry and the radio interface circuitry are configured to:
  manage access to resources of the LTE RAT by a user equipment (UE) served by the eNB, based on one or more radio resource management (RRM) policies for the LTE RAT; and
  send to the gNB a request to establish dual connectivity with the UE as a secondary node (SN), wherein the request includes a Subscribers Profile ID for RAT/Frequency Priority (SPID) that is associated with the one or more RRM policies.

13. The eNB of claim 12, wherein:
 the SPID is also associated with one or more further RRM policies for the NR RAT; and
 the one or more further RRM policies for the NR RAT are the same as the one or more RRM policies for the LTE RAT.

14. The eNB of claim 12, wherein the processing circuitry and the radio interface circuitry are further configured to receive the SPID from an Evolved Packet Core (EPC) network.

15. The eNB of claim 12, wherein the SPID relates to one or more of the following: the UE, a subscriber associated with the UE, and a group of UEs that includes the UE.

16. The eNB of claim 12, wherein the processing circuitry and the radio interface circuitry are configured to manage access to resources of the LTE RAT by the UE based on:
 mapping the SPID to a particular network slice associated with the LTE RAT; and
 scheduling resources of the LTE RAT for UE transmission or reception of data, based on the following associated with the particular network slice:
  one or more scheduling parameters, and
  a predefined share of the resources of the LTE RAT.

17. A next-generation Node B (gNB) configured with a New Radio (NR) radio access technology (RAT), the gNB comprising:
 communication interface circuitry configured to communicate with an evolved Node B (eNB) configured with a Long-Term Evolution (LTE) radio access technology (RAT); and
 processing circuitry operably coupled to the communication circuitry, whereby the processing circuitry and the communication circuitry are configured to perform operations corresponding to the method of claim 7.

18. The gNB of claim 17, wherein:
 the SPID is also associated with one or more further RRM policies for the LTE RAT; and
 the one or more further RRM policies for the LTE RAT are the same as the one or more RRM policies for the NR RAT.

19. The gNB of claim 17, wherein the SPID relates to one or more of the following: the UE, a subscriber associated with the UE, and a group of UEs that includes the UE.

20. The gNB of claim 17, wherein:
the SPID is one of a first group of one or more SPIDs; and
the one or more RRM policies include one or more of the following:
- a first policy that prioritizes access by the UE to the resources of the NR RAT over access by UEs that are not associated with any SPIDs of the first group; and
- a second policy that guarantees access by the UEs associated with the first group of SPIDs to at least a predefined share of the resources of the NR RAT.

* * * * *